US011321466B2

(12) United States Patent
Le Roy et al.

(10) Patent No.: US 11,321,466 B2
(45) Date of Patent: May 3, 2022

(54) INTEGRATED CIRCUIT DATA PROTECTION

(71) Applicant: QUALCOMM Incorporated, San Diego, CA (US)

(72) Inventors: Vincent Pierre Le Roy, San Diego, CA (US); Baranidharan Muthukumaran, San Diego, CA (US); David Tamagno, Livermore, CA (US)

(73) Assignee: QUALCOMM Incorporated, San Diego, CA (US)

( * ) Notice: Subject to any disclaimer, the term of this patent is extended or adjusted under 35 U.S.C. 154(b) by 371 days.

(21) Appl. No.: 16/296,066

(22) Filed: Mar. 7, 2019

(65) Prior Publication Data

US 2019/0278914 A1  Sep. 12, 2019

Related U.S. Application Data

(60) Provisional application No. 62/640,942, filed on Mar. 9, 2018.

(51) Int. Cl.
*G06F 21/57* (2013.01)
*G06F 8/65* (2018.01)
(Continued)

(52) U.S. Cl.
CPC ............ *G06F 21/575* (2013.01); *G06F 8/65* (2013.01); *G06F 21/123* (2013.01); *G06F 21/44* (2013.01); *G06F 21/55* (2013.01); *G06F 21/57* (2013.01); *G06F 21/64* (2013.01); *G06F 21/73* (2013.01); *G06F 21/78* (2013.01); *H04L 9/3228* (2013.01); *H04L 9/3242* (2013.01)

(58) Field of Classification Search
CPC ...... G06F 21/57; G06F 21/575; G06F 21/123; G06F 21/44; G06F 21/55; G06F 8/65
See application file for complete search history.

(56) References Cited

U.S. PATENT DOCUMENTS

| 2009/0193261 | A1* | 7/2009 | Yang | ..................... H04L 9/3242 713/181 |
| 2011/0113484 | A1* | 5/2011 | Zeuthen | .................. G06F 21/32 726/19 |

(Continued)

OTHER PUBLICATIONS

Badrignans et al., "SARFUM: Security Architecture for Remote FPGA Update and Monitoring", May 2010, ACM Transactions on Reconfigurable Technology and Systems, vol. 3, No. 2, Article 8, pp. 17-18. (Year: 2010).*

(Continued)

*Primary Examiner* — Kristine L Kincaid
*Assistant Examiner* — Alexander R Lapian
(74) *Attorney, Agent, or Firm* — Thien T. Nguyen

(57) ABSTRACT

Techniques for providing data protection in an integrated circuit are provided. An example method according to these techniques includes determining that an unauthorized update has been made to software or firmware associated with the integrated circuit, and corrupting an anti-replay counter (ARC) value, maintained in a one-time programmable memory of the integrated circuit and used by the integrated circuit to protect contents of a non-volatile memory, responsive to determining that the unauthorized update has been made to the software or the firmware.

17 Claims, 11 Drawing Sheets

(51) Int. Cl.
  *G06F 21/64* (2013.01)
  *G06F 21/73* (2013.01)
  *G06F 21/44* (2013.01)
  *G06F 21/12* (2013.01)
  *G06F 21/78* (2013.01)
  *H04L 9/32* (2006.01)
  *G06F 21/55* (2013.01)

(56) References Cited

U.S. PATENT DOCUMENTS

| | | | |
|---|---|---|---|
| 2013/0174279 A1 | 7/2013 | Mantin et al. | |
| 2014/0075522 A1* | 3/2014 | Paris | G06F 21/57 |
| | | | 726/5 |
| 2014/0229744 A1* | 8/2014 | Doumen | G06F 21/125 |
| | | | 713/190 |
| 2016/0026783 A1* | 1/2016 | Buer | G06F 21/79 |
| | | | 711/103 |
| 2016/0140357 A1* | 5/2016 | Newell | G06F 21/79 |
| | | | 726/2 |
| 2016/0232343 A1* | 8/2016 | Post | G06F 9/4401 |
| 2016/0306976 A1 | 10/2016 | Gantman et al. | |
| 2017/0054563 A1* | 2/2017 | Verma | G06F 21/6245 |
| 2017/0329994 A1 | 11/2017 | Le et al. | |
| 2019/0229913 A1* | 7/2019 | Fava | H04L 9/32 |

OTHER PUBLICATIONS

International Search Report and Written Opinion—PCT/US2019/021275—ISA/EPO—dated May 13, 2019

* cited by examiner

INTEGRATED CIRCUIT DATA PROTECTION

CROSS-REFERENCES TO RELATED APPLICATIONS

This application claims priority to U.S. Provisional Patent Application No. 62/640,942, filed Mar. 9, 2018, entitled "TECHNIQUES FOR INSIDER ATTACK RESISTANCE TO PROTECT USER DATA," the entire disclosure of which is hereby incorporated by reference for all purposes.

BACKGROUND

Computing devices typically store sensitive data owned by users or enterprises, with firmware or operating system software on the computing devices owned by a computing device or secure module manufacturer. The firmware or software owners can load software to computing devices that alters security measures, e.g., removes brute force attack mitigations, disables secure boot/trust boot, and/or loads other firmware or software on the computing devices.

SUMMARY

An example method for providing data protection in an integrated circuit according to the disclosure includes determining that an unauthorized update has been made to software or firmware associated with the integrated circuit; and corrupting an anti-replay counter (ARC) value maintained in a one-time programmable memory of the integrated circuit and used by the integrated circuit to protect contents of a non-volatile memory responsive to determining that the unauthorized update has been made to the software or the firmware.

Implementations of such a method can include one or more of the following features. The determining that the unauthorized update has been made to the software or the firmware associated with the integrated circuit includes detecting a change to the software on the integrated circuit; authenticating at least one of a user and the software in response to detecting the change to the software on the integrated circuit; and determining that the change to the software on the integrated circuit was unauthorized in response to the at least one of the user and the software not being authenticated. The authenticating of the user includes determining whether the user has been authenticated; and performing at least one authentication procedure to authenticate the user in response to the user not having been authenticated. The authenticating of the software includes determining a message authentication code (MAC) for the software by applying a cipher-based message authentication code (CMAC) algorithm to the software using a key derived from a Hardware Unique Key (HUK) associated with the integrated circuit; and comparing the MAC with a previously determined MAC to determine whether the MAC matches the previously determined MAC. The corrupting of the ARC value further includes updating an ARC value stored in one-time programmable memory with a current ARC value maintained in volatile memory. Corrupting of the ARC value includes determining a first number of bits of the one-time programmable memory storing the ARC value to be set; determining locations of a first set of bits of the one-time programmable memory comprising the first number of bits; and updating the ARC value stored in the one-time programmable memory by setting the first set of bits of the one-time programmable memory. The determining the first number of bits of the one-time programmable memory to set further includes determining the first number of bits of the one-time programmable memory to set based on a second number of bits already set in the one-time programmable memory. The determining of the first set of bits of the one-time programmable memory to be set further includes randomly selecting the first set of bits of the one-time programmable memory from a second set of bits that have not been set in the one-time programmable memory.

An example integrated circuit according to the disclosure includes means for determining that an unauthorized update has been made to software or firmware associated with the integrated circuit; and means for corrupting an anti-replay counter (ARC) value maintained in a one-time programmable memory of the integrated circuit and used by the integrated circuit to protect contents of a non-volatile memory responsive to determining that the unauthorized update has been made to the software or the firmware.

Implementations of such an integrated circuit can include one or more of the following features. The means for determining that the unauthorized update has been made to the software or the firmware includes means for detecting a change to the software on the integrated circuit; means for authenticating at least one of a user and the software in response to detecting the change to the software on the integrated circuit; and means for determining that the change to the software on the integrated circuit was unauthorized in response to the at least one of the user and the software not being authenticated. The means for authenticating the user include means for determining whether the user has been authenticated; and means for performing at least one authentication procedure to authenticate the user in response to the user not having been authenticated. The means for authenticating the software include means for determining a message authentication code (MAC) for the software by applying a cipher-based message authentication code (CMAC) algorithm to the software using a key derived from a Hardware Unique Key (HUK) associated with the integrated circuit; and means for comparing the MAC with a previously determined MAC to determine whether the MAC matches the previously determined MAC. The means for corrupting the ARC value include means for updating a first ARC value stored in one-time programmable memory with a second ARC value maintained in volatile memory of the integrated circuit. The integrated circuit further includes means for determining a first number of bits of the one-time programmable memory to be set; means for determining locations of a first set of bits of the one-time programmable memory comprising the first number of bits; and means for updating the ARC value stored in the one-time programmable memory by setting the first set of bits of the one-time programmable memory. The means for determining the first number of bits of the one-time programmable memory to set include means for determining the first number of bits of the one-time programmable memory to set based on a second number of bits already set in the one-time programmable memory. The means for determining which bits of the one-time programmable memory to set include means for randomly selecting the first set of bits of the one-time programmable memory from a second set of bits that have not been set in the one-time programmable memory.

An example integrated circuit according to the disclosure includes a one-time programmable memory and a processor coupled to the one-time programmable memory. The processor is configured to determine that an unauthorized update has been made to software or firmware associated with the integrated circuit; and corrupt an anti-replay counter (ARC) value maintained in a one-time programmable memory of the integrated circuit and used by the integrated circuit to protect contents of a non-volatile memory responsive to determining that the unauthorized update has been made to the software or the firmware.

Implementations of such an integrated circuit can include one or more of the following features. The processor being configured to determine that the unauthorized update has been made to the software or the firmware is further configured to detect a change to the software on the integrated circuit; authenticate at least one of a user and the software in response to detecting the change to the software on the integrated circuit; and determine that the change to the software on the integrated circuit was unauthorized in response to the at least one of the user and the software not being authenticated. The processor being configured to authenticate the user is further configured to determine whether the user has been authenticated; and perform at least one authentication procedure to authenticate the user in response to the user not having been authenticated. The processor being configured to authenticate the software is further configured to determine a message authentication code (MAC) for the software by applying a cipher-based message authentication code (CMAC) algorithm to the software using a key derived from a Hardware Unique Key (HUK) associated with the integrated circuit; and compare the MAC with a previously determined MAC to determine whether the MAC matches the previously determined MAC. The processor being configured to corrupt the ARC value is further configured to update a first ARC value stored in the one-time programmable memory with a second ARC value maintained in volatile memory of the integrated circuit. The processor is further configured to determine a first number of bits of the one-time programmable memory storing the ARC value to be set; determine locations of a first set of bits of the one-time programmable memory comprising the first number of bits; and update the ARC value stored in the one-time programmable memory by setting the first set of bits of the one-time programmable memory. The processor being configured to determine the first number of bits of the one-time programmable memory to set is further configured to determine the first number of bits of the one-time programmable memory to set based on a second number of bits already set in the one-time programmable memory. The processor being configured to determine which bits of the one-time programmable memory to set is further configured to randomly select the first set of bits of the one-time programmable memory from a second set of bits that have not been set in the one-time programmable memory.

An example non-transitory, computer-readable medium, having stored thereon computer-readable instructions for providing data protection in an integrated circuit, according to the disclosure includes instructions configured to cause a computer to determine that an unauthorized update has been made to software or firmware associated with the integrated circuit; and corrupt an anti-replay counter (ARC) value maintained in a one-time programmable memory of the integrated circuit and used by the integrated circuit to protect contents of a non-volatile memory responsive to determining that the unauthorized update has been made to the software or the firmware.

Implementations of such a non-transitory, computer-readable medium can include one or more of the following features. The instructions configured to cause the computer to determine that the unauthorized update has been made to the software or the firmware include instructions configured to cause the computer to detect a change to the software on the integrated circuit; authenticate at least one of a user and the software in response to detecting the change to the software on the integrated circuit; and determine that the change to the software on the integrated circuit was unauthorized in response to the at least one of the user and the software not being authenticated. The instructions configured to cause the computer to corrupt the ARC value include instructions configured to cause the computer to update a first ARC value stored in one-time programmable memory with a second ARC value maintained in volatile memory of the integrated circuit. The non-transitory, computer-readable medium includes instructions configured to cause the computer to determine a first number of bits of the one-time programmable memory storing the ARC value to be set; determine locations of a first set of bits of the one-time programmable memory comprising the first number of bits; and update the ARC value stored in the one-time programmable memory by setting the first set of bits of the one-time programmable memory. The instructions configured to cause the computer to determine the first number of bits of the one-time programmable memory to set include instructions configured to cause the computer to determine the first number of bits of the one-time programmable memory to set based on a second number of bits already set in the one-time programmable memory. The instructions configured to cause the computer to determine which bits of the one-time programmable memory to set include instructions configured to cause the computer to randomly select the first set of bits of the one-time programmable memory from a second set of bits that have not been set in the one-time programmable memory.

DETAILED DESCRIPTION

Figure 1:
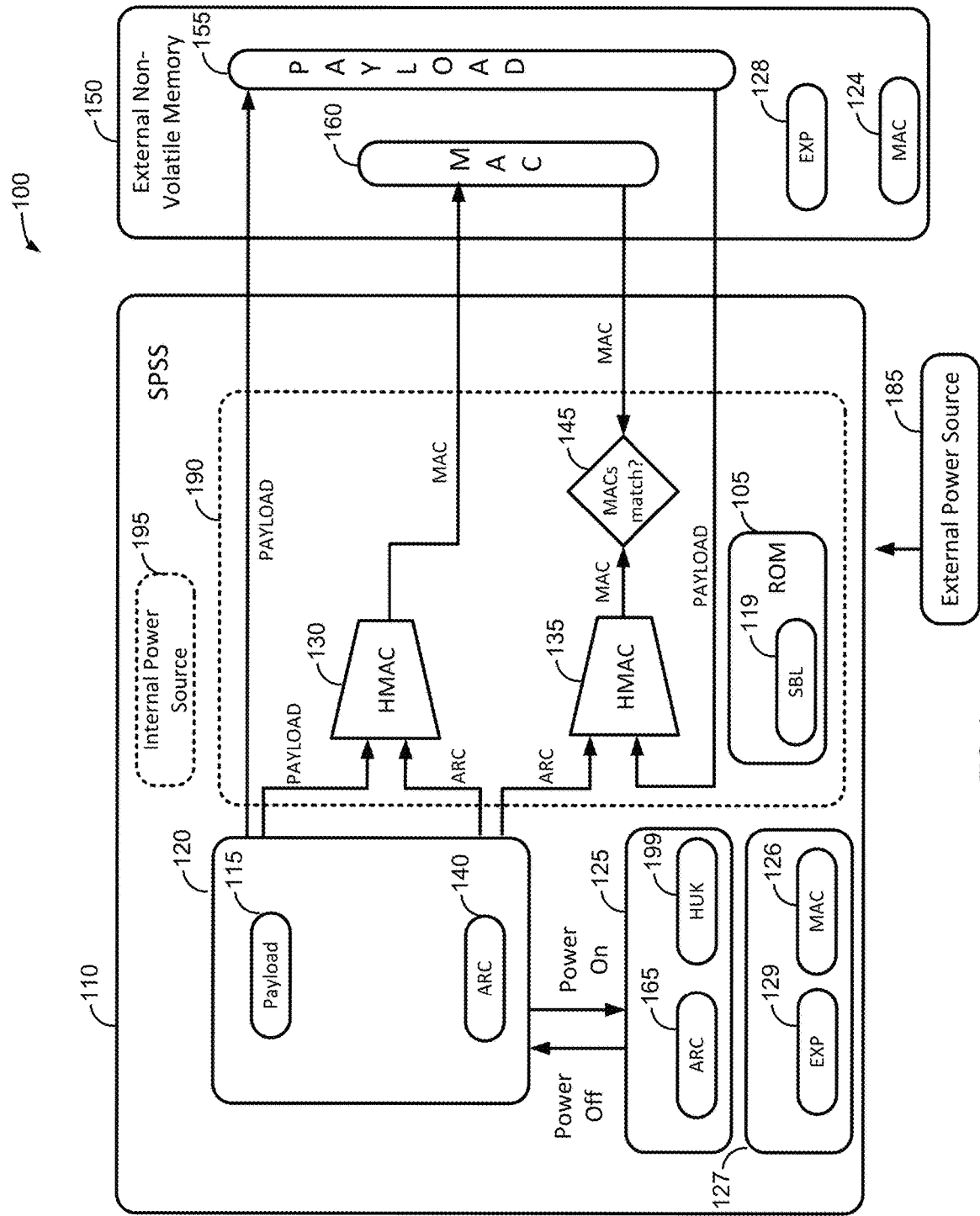
FIG. 1 is a functional block diagram of an example computer system.

Techniques are disclosed herein for preventing an unauthorized circumvention of data protections for sensitive data on a computing device. These techniques can mitigate attempts by firmware or software owners to circumvent these data protections by replacing firmware and/or software on the computing device. An unauthorized user who has physical access to the computing device may attempt to generate a signed firmware image that appears to be legitimate, and that when executed, can access the sensitive data stored on the computing device. The techniques disclosed herein can be used to detect an unauthorized update to software and/or firmware associated with the computing device, and sensitive data can be rendered unrecoverable to prevent the unauthorized software or firmware from obtaining the sensitive data.

The computing device can comprise an integrated circuit, such as a system on a chip (SoC), and a non-volatile memory (NVM) (also referred to herein as an "external NVM") in which sensitive data used by the integrated circuit can be stored. The contents of the NVM can be encrypted to prevent unauthorized access to the contents of the NVM. An attacker who has physical access to the computing device may attempt to generate a signed firmware image that appears to be legitimate, and that when executed, can access the sensitive data stored in the NVM. The techniques disclosed herein can be used to detect an unauthorized update to software and/or firmware of the computing device, and the contents of the NVM can be rendered unrecoverable to prevent the unauthorized software and/or firmware from obtaining the contents of the NVM.

The contents of the NVM can be protected by an anti-replay mechanism. The anti-replay mechanism can be a fuse-based anti-replay mechanism in which fuses of a one-time programmable memory of the integrated circuit of the computing device are used to maintain an anti-replay counter (ARC) that can be used to prevent replay attacks on data stored in the non-volatile memory (NVM). The ARC can be used to provide data integrity for the contents of the NVM through the use of message authentication or other means. The ARC can be used to provide data confidentiality of the contents of the NVM (also referred to herein as "payload" data) when used with a Hardware Unique Key (HUK) or secret information to produce a cryptographic key that can be used to encrypt the contents of the NVM. The ARC is used by the secure processing subsystem to recover the value of the payload before being encrypted and stored in the NVM.

The ARC can be maintained in one-time programmable memory of the integrated circuit that could be accessed by the unauthorized software and/or firmware update introduced to the device by the attacker. The techniques disclosed herein can be used to detect such an unauthorized update and to corrupt the ARC in the one-time programmable memory so that the attacker would be unable to recover the content stored in the NVM. The attacker may be able to obtain the payload from the NVM. But the ARC value used as the encryption key will have been rendered unrecoverable, thereby preventing the attacker from recovering the unencrypted contents of the payload. While the examples disclosed herein are referred to as "fuse-based" anti-replay mechanisms, the techniques disclosed herein are not limited to implementations of one-time programmable memory that uses fuses. Other implementations may use antifuses or other components that can be set once and that can be used to represent a bit of data instead of fuses.

FIG. 1 is a functional block diagram of an example computing device 100. The computing device 100 comprises a secure processing subsystem (SPSS) 110 and an external non-volatile memory (NVM) 150 external to the secure processing subsystem 110 that can be used by the secure processing subsystem 110 to store data. The secure processing subsystem 110 can be implemented as a system-on-a-chip (SoC) or other similar device that includes a processor element and memory implemented on an integrated circuit. The secure processing subsystem 110 can be implemented on the integrated circuit, and the NVM 150 can be implemented as off-chip memory or an external memory that is not implemented on the same integrated circuit as the secure processing subsystem 110. The secure processing subsystem 110 can be communicably coupled, either directly or indirectly connected, with the NVM 150 and configured to store data in the NVM 150 and access data from the NVM 150.

The processor 190 of the secure processing subsystem can implement the various functions and functional elements discussed herein with regard to the secure processing subsystem 110. For example, the following functional elements: (hash message authentication code) HMAC block 130, HMAC block 135, and/or the matching block 145, can be implemented by a processor 190 of the secure processing subsystem 110. The functionality of the HMAC block 130, HMAC block 135, and the matching block 145 are described in greater detail below. The example implementation illustrated in FIG. 1 includes these functional blocks for verifying the integrity of the payload 155 stored in the NVM 150 using the message authentication code (MAC) 160 written to the NVM 150 with the payload 155. However, other implementations can utilize a different technique for verifying the integrity of the payload 155 stored in the NVM 150. Furthermore, the secure processing subsystem 110 can be configured to generate a cryptographic signature of at least a part of the data or a digest of the data to be written to the external NVM 150. For example, the processor 190 of the secure processing subsystem 110 can be configured to generate a hash of at least part of the data or a digest of the data and to encrypt the hash or digest of the data. The encrypted hash may be stored in the external NVM 150 with the data instead of or in addition to the MAC 160.

The secure processing subsystem can also be implemented by a general-purpose processor, such as processor 190 of the computing device 100, which can be configured to segregate secure processing resources and memory from general processing resources and memory for non-secure applications. The secure processing subsystem 110 can provide a secure execution environment for processor-executable program code and for secure data storage that can prevent unauthorized access to the data stored therein and/or prevent unauthorized execution of processor-executable program instructions by a processor of the secure processing subsystem 110. The secure processing subsystem 110 can implement a trusted execution environment (TEE) comprising a secure area of the processor 190. The TEE can provide an isolated operating environment for program code and data within the TEE that provides confidentiality and integrity for the program code and data within the TEE. The computing device 100 can include a non-secure processing subsystem (not shown) in which untrusted program code can be executed and non-sensitive data can be stored. The processor 190 may provide this non-secure processing subsystem or the computing device 100 may include one or more additional processors (not shown) that provide a non-secure processing environment that is segregated from the secure processing subsystem 110.

The secure processing subsystem 110 can include a volatile memory 120 and a non-volatile memory, such as a one-time programmable memory 125. The volatile memory 120 can comprise memory that is configured to maintain the data stored therein while power is provided to the volatile memory 120. The contents of the volatile memory 120 will be lost if the power supplied to the secure processing subsystem 110 is lost. The one-time programmable memory 125 comprises a persistent memory that retains the data stored therein even if power to the secure processing subsystem 110 is lost. The one-time programmable memory 125 can comprise a plurality of fuses that each represent a bit of data, and the value of a particular bit can be set by blowing the corresponding fuse. The value of a fuse, once set, cannot be changed. The value of the fuse in its original state may be used to represent a bit value of zero (0), and the value of the fuse once blown may be used to represent a bit value of one ('1'). In other embodiments, the value of the fuse in its original state may be used to represent a bit value of one ('1'), and the value of the fuse once blown may be used to represent a bit value of one ('0'). Furthermore, other types of one-time programmable memory 125 may be used. The one-time programmable memory 125 may comprise anti-fuses or other components that can be set once and that can be used to represent a bit of data instead of fuses. The one-time programmable nature of the one-time programmable memory 125 means that the one-time programmable memory 125 may eventually be exhausted. The techniques disclosed herein reduce the frequency with which the ARC needs to be incremented in the one-time programmable memory 125, thereby reducing the rate at which the one-time programmable memory 125 is consumed.

The secure processing subsystem 110 may include an internal power source 195. The internal power source can be used as a secondary power source that can provide power to the secure processing subsystem in the event that power from the external power source 185 is lost. The internal power source 195 can comprise a capacitor, a battery, or other device that can store electrical power that can power the secure processing subsystem 110 for at least a short period of time in the event that power from the external power source 185 is lost. The internal power source 195 can be configured to provide the secure processing subsystem 110 with sufficient power to allow the secure processing subsystem 110 to write the current anti-replay counter (ARC) 140 stored in the volatile memory 120 to the ARC 165 stored in the one-time programmable memory 125 so that the ARC is not lost due to the computing device losing power.

The external power source 185 is a power source that is separate from the secure processing subsystem 110 and may be removable from the computing device 100. The external power source 185 may comprise a battery or other device that can provide electrical power to the components of the computing device 100. The computing device 100 may include a sensor (not shown in FIG. 1) that can provide a signal to the secure processing subsystem 110 responsive to the sensor detecting a physical intrusion of the computing device. The external power source 185 may be removable, such that the external power source 185 can be removed and replaced with another external power source 185. A user of the computing device 100 may swap the external power source 185 for another external power source 185, e.g., if the power source is depleted or the user of the device wishes to force the computing device 100 to reboot.

The secure processing subsystem 110 can be configured to store an anti-replay counter (ARC) value, referred to as ARC 165, in the one-time programmable memory 125 responsive to a loss of power event. The term "loss of power" as used herein indicates that the external power source 185 is no longer providing electrical power to the secure processing subsystem 110, is providing a level of electrical power that is insufficient to enable the secure processing subsystem 110 to operate, or that the remaining power level of the external power source 185 has reached a threshold where loss of power to the secure processing subsystem is imminent. Loss of power may result from the removal of the external power source 185 from the computing device 100, where the external power source 185 comprises a battery or other removable source of power. A loss of power event in such a situation may be detected by the external power source 185 no longer providing power to the secure processing subsystem 110, the external power source 185 is no longer providing a sufficient level of electrical power to enable the secure processing subsystem 110 to operate, the external power source 185 reaching a predetermined level, based on a signal from a physical intrusion sensor indicative of a battery compartment or housing of the computing device 100 having been opened, or a combination of two or more of these factors.

One or more other events can also trigger the processor 190 of the secure processing subsystem 110 to store the ARC 140 from the non-volatile memory in the one-time programmable memory 125 as ARC 165. These trigger events may include, but are not limited to: (1) the secure processing subsystem 110 making a determination that a remaining power level of the external power source 185 has reached a predetermined threshold indicating that power from the external power source 185 may be lost soon and/or may no longer be able to provide a level of electrical power that is sufficient to enable the secure processing subsystem 110 to operate, (2) the computing device 100 is being shut down or rebooted and the ARC 140 from the non-volatile memory will be lost if not written to the one-time programmable memory 125 as ARC 165, and (3) the secure processing subsystem 110 receives a signal from a sensor of the computing device 100 which indicates that the battery or other external power source may be removed from the computing device 100.

The secure processing subsystem 110 of the computing device 100 can use the ARC 140 to prevent replay attacks in which an attacker attempts to place expired but otherwise valid data in the external NVM 150 in an attempt to gain access to the secure processing subsystem 110 or to have the secure processing subsystem 110 perform some unauthorized action. To avoid replay attacks, the secure processing subsystem 110 relies on the ARC 140 to ensure that data stored in the NVM 150 cannot be manipulated without being detected. The secure processing subsystem can generate data, referred to herein as payload data 115, in the volatile memory 120 of the secure processing subsystem 110. However, the amount of non-volatile memory available as on-chip memory of the integrated circuit is typically limited by size and cost constraints, and the secure processing subsystem 110 may need to offload the payload data 115 to the external NVM 150 to free up memory for additional processing task. The secure processing subsystem 110 may offload the payload data 115 to the external NVM 150 that may be required later and can be written to the external NVM 150 for persistent storage since the size of one-time programmable memory 125 is generally limited and each bit of the one-time programmable memory 125 can only be written to once.

The processor 190 of the secure processing subsystem 110 can retrieve the ARC 165, e.g., at the time that the computing device 100 is powered on, from the one-time programmable memory 125 and store the ARC 140 in the volatile memory 120. The ARC 140 can be maintained in the volatile memory 120 until a triggering event occurs that causes the processor 190 of the secure processing subsystem 110 to update the ARC 165 in the one-time programmable memory with the current value of the ARC 140 stored in the volatile memory 120. A triggering event is an event which indicates that the external power supply to the secure processing subsystem 110 may be or has been lost or is no longer able to provide a sufficient level of energy to the secure processing subsystem 110 to enable the secure processing subsystem 110 to operate, and thus, the contents of the volatile memory 120 will be lost unless backed up. Maintaining the ARC 140 in the volatile memory 120 until such a triggering event occurs allows the secure processing subsystem 110 to significantly reduce the number of fuses that would otherwise be used to maintain the ARC 165 in the one-time programmable memory 125. The ARC 140 is updated each time that data is written to the external NVM 150. If the ARC 165 were maintained in the one-time programmable memory 125, at least one fuse of the one-time programmable memory 125 would be blown each time a write event to the NVM occurred. The number of fuses comprising the one-time programmable memory 125 is typically relatively small due to the size and cost considerations for fabricating the integrated circuit on which the secure processing subsystem 110 is implemented. The fuses of the one-time programmable memory 125 may be quickly exhausted, leaving the secure processing subsystem 110 with no on-chip storage for securely storing the ARCs in a persistent memory that would not be lost when the computing device 100 is powered down or rebooted.

The ARC 140 can be used by the secure processing subsystem 110 to generate a message authentication code (MAC) 160 that can be written to the external NVM 150 with the payload 155 to be stored therein. The MAC 160 can be used to provide integrity protection to the payload 155. The MAC can be recomputed by the processor 190 when the payload 155 is accessed. If the payload 155 were to be modified, the MAC 160 stored with the payload 155 would not match the recomputed MAC value.

The HMAC block 130 can be configured to generate the MAC 160 by applying a keyed-HMAC algorithm to the payload data 115 stored in the volatile memory 120 which is to be written to the external NVM 150. The HMAC block 130 can use at least a portion of the ARC 140 as a key parameter for the HMAC algorithm. The secure processing subsystem 110 may have encrypted or otherwise processed the payload data 115 prior to the calculating the MAC 160. The secure processing subsystem 110 can be configured to write the MAC 160 and the payload 155 to the external NVM 150. The secure processing subsystem 110 can be configured to communicate with the external NVM 150 via a bus or other communication pathway of the computing device 100.

The secure processing subsystem 110 can be configured to retrieve the payload 155 and the MAC 160 from the external NVM 150. The HMAC block 135 can receive the payload 155 and the current value of the ARC 140 from the volatile memory 120 and recalculate the MAC for the payload 155 based on the current ARC 140. The matching block 145 can compare the newly calculated MAC value with the MAC 160. If the MAC 160 matches the newly calculate MAC value, then the payload 155 has not been modified nor has there been a replay attack in which expired payload data and an expired MAC were inserted in the external NVM 150. If the MAC 160 does not match the newly calculate MAC value, then the payload 155 has been modified or corrupted or there has there been a replay attack in which expired payload data and/or an expired MAC were inserted in the external NVM 150. The MAC 160 associated with the expired payload data would not match the MAC recalculated by the HMAC block 135 because the ARC 140 stored in the volatile memory 120 is updated each time that data is written to the external NVM 150. The ARC 140 would have been incremented one or more times since the MAC 160 was determined for the payload 155, thus the newly determined MAC based on the current value of the ARC 140 would not match the MAC 160.

The functionality of the HMAC block 130, the HMAC block 135, and the matching block 145 can be implemented in hardware of the secure processing subsystem, or may be implemented as processor-executable program code that is executed by the processor 190 of the secure processing subsystem 110. The functionality of the HMAC block 130, the HMAC block 135, and the matching block 145 can also be implemented as a combination of processor-executable program code and hardware.

Figure 4:
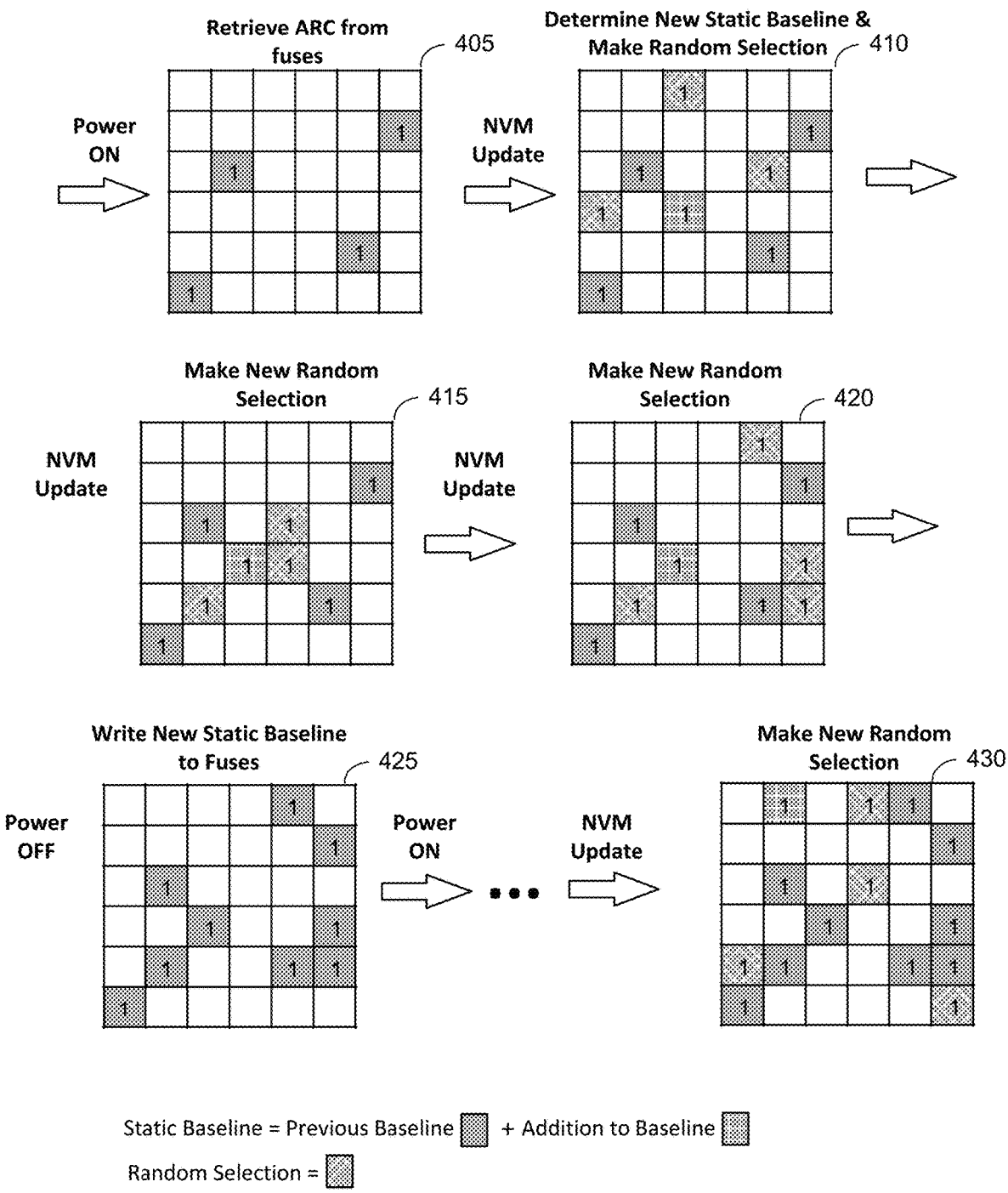
FIG. 4 is a diagram illustrating a nonce-based technique for maintaining an anti-replay counter.
Figure 5:
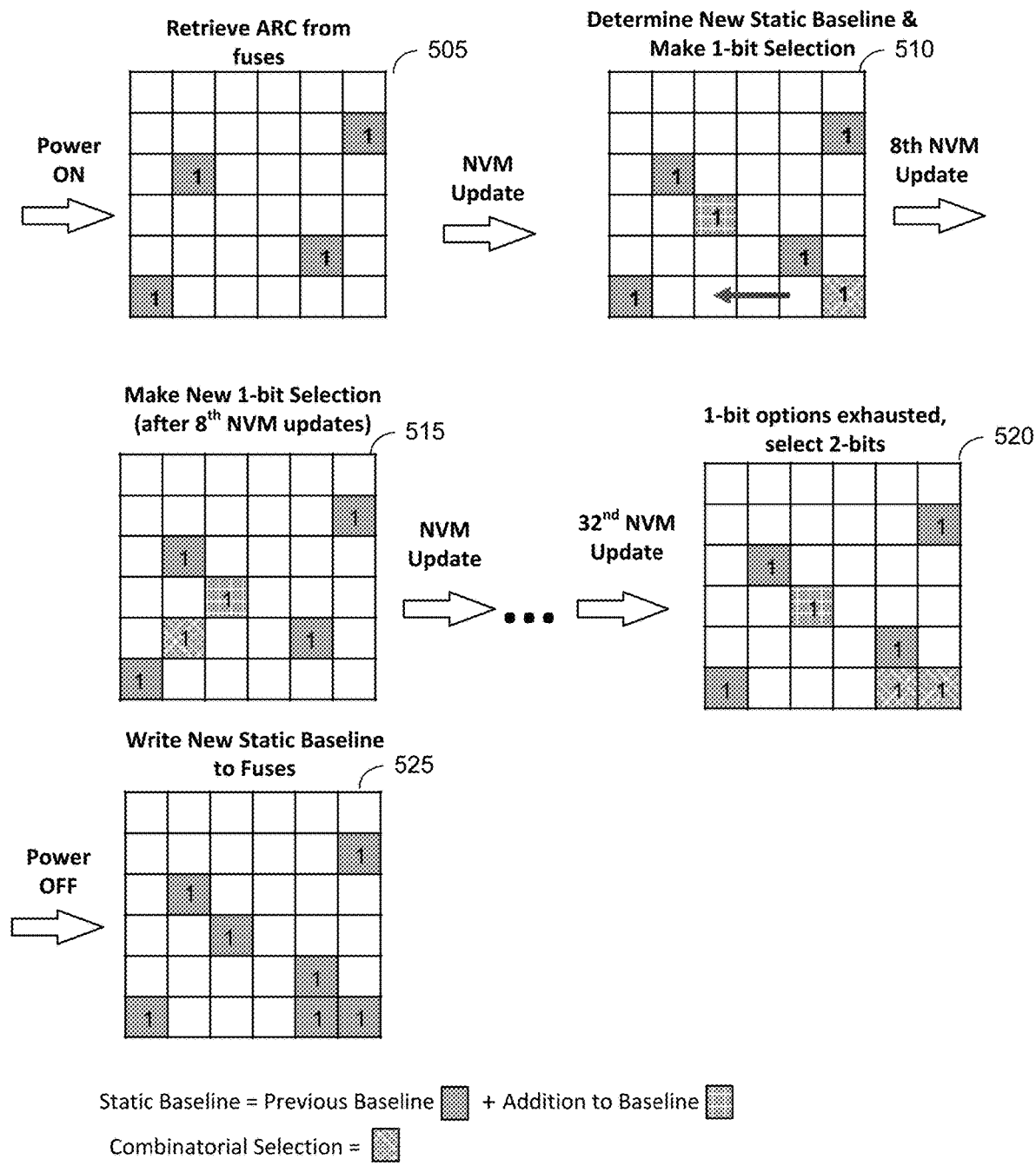
FIG. 5 is a diagram illustrating another technique for maintaining an anti-replay counter.
Figure 6:
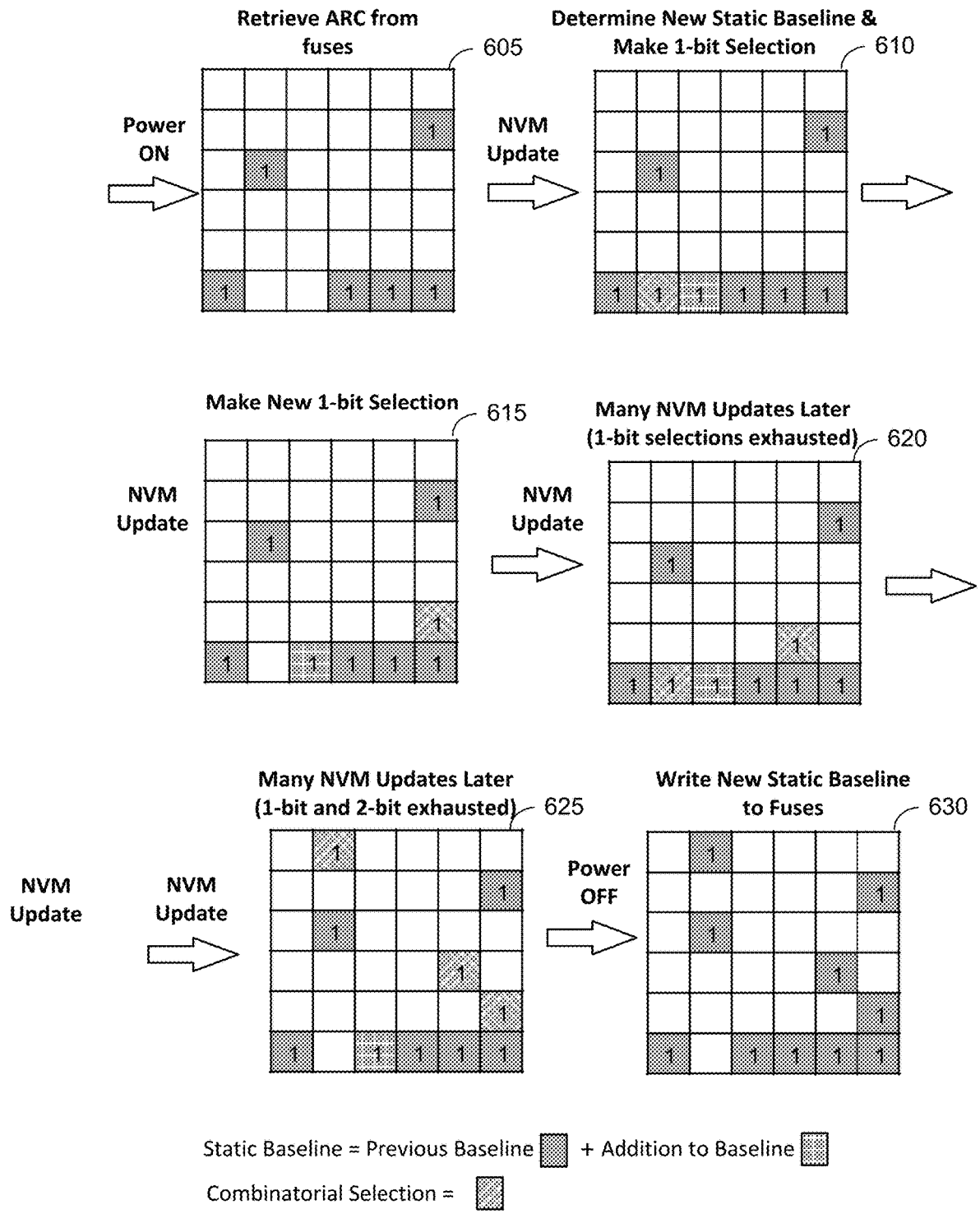
FIG. 6 is a diagram illustrating another technique for maintaining an anti-replay counter.

As illustrated in FIG. 1, the processor 190 of the secure processing subsystem 110 is configured to calculate a MAC 160 for the payload 155 to be written to the external NVM 150. The MAC 160 can be generated using a keyed-hash message authentication code (HMAC). The HMAC algorithm is configured to receive data for which the MAC value is to be generated and a secret key used to generate the MAC value from data. FIG. 1 illustrates an example of the secure processing subsystem 110 including an HMAC block 130 that receives payload data and the ARC 140 stored in the volatile memory 120 of the secure processing subsystem 110. At least a portion of the ARC 140 can be selected by the HMAC block 130 for use in generating the MAC 160 for the data that will be written to the external NVM 150, which is referred to in FIG. 1 as the payload 155. The value of the ARC 140 stored in the volatile memory 120 can be incremented to a new value according prior to the MAC 160 being incremented to prevent a replay attack. The value of the ARC 140 can be incremented using various techniques where at least a portion of the ARC 140 may be selected using a random algorithm or a combinatorial algorithm. FIGS. 4-6 discussed below illustrate example processes in which the value of the ARC is incremented using various techniques.

The example computing device 100 illustrated in FIG. 1 can also be adapted to account for payload data 115 of varying sizes. For example, the payload size may comprise data that comprises the whole of the external NVM 150, data that corresponds to a memory page, or data of any size that has been flagged as being sensitive. Data not flagged as sensitive may be stored in the external NVM 150 without the MAC 160 or other such associated protections that may be provided for the payload 155.

The example computing device 100 can include an internal non-volatile memory 127. In some aspects, the internal non-volatile memory 127 may be implemented as a component of the secure processing subsystem 110. For example, the secure processing subsystem 110 may be implemented as a system on a chip, and the internal non-volatile memory 127 can be internal to the secure processing subsystem 110. In contrast, the external NVM 150 is implemented separate from the secure processing subsystem 110. The internal NVM 127, like the external NVM 150, is a persistent memory that is configured to retain the contents of the memory if power to the memory is lost, in contrast with the volatile memory 120, which will lose the contents stored therein if power to the memory is lost or drops below a level required to enable the memory 120 to operate. The internal NVM 127 and the external NVM 150 may comprise flash memory and/or other types of persistent memory that can be written to multiple times, in contrast with the one-time programmable memory 125 in which each bit can only be written to one time. The internal NVM 127 can store executable program code that can be executed by the processor 190, such as the executable program code (EXP) 129, illustrated in FIG. 1. The external NVM 150 can also be used to store executable program code that can be executed by the processor 190, such as the EXP 128 illustrated in FIG. 1.

The computing device 100 can include a Hardware Unique Key (HUK) 199 associated with the computing device. The HUK 199 can comprise a bit string that is stored in the one-time programmable memory 125 and/or in another secure memory location of the computing device 100 that is accessible by the processor 190 but is accessible to certain trusted components of the computing device 100 but is inaccessible to untrusted program code. The HUK 199 may be generated and programmed into the one-time programmable memory 125 by an original equipment manufacturer (OEM) of the computing device 100. The OEM may provide the HUK 199 to trusted entities that may provide software and/or firmware updates to the computing device 100 to update software and/or firmware associated with the computing device 100, so that the computing device 100 can authenticate these updates. The usage of the term "associated with" in this context refers to software and/or firmware that is installed in the internal NVM 127, such as EXP 129, and/or software and/or firmware that is installed in the external NVM, such as EXP 128. The software and/or firmware and may be loaded into a volatile memory 120 for execution by the processor 190 of the computing device 100.

An update to software and/or firmware may comprise an image file that includes a MAC value that has been computed using a cipher-based message authentication code (CMAC) algorithm. An image file can be downloaded to the computing device 100 via network connection, copied to the device from removable media, such as a flash drive, and/or provided to the computing device 100 via other means. If the firmware and/or software update is authentic, the MAC included in the image file should have been calculated using the HUK 199 associated with the computing device 100. The processor 190 can compute a MAC based on at least a portion of the image file that includes the firmware and/or software update and by providing a key based on the HUK 199 to the CMAC algorithm. The key based on the HUK 199 may be derived from the HUK 199 using a key derivation algorithm executed by the processor 190. The processor 190 can be configured to determine that the update was unauthorized if the MAC included in the image file does not match the MAC computed by the processor 190. The processor 190 can be configured to corrupt the ARC 165 and clear the ARC 140 from the volatile memory in response to such an unauthorized update. In some implementations, the processor 190 may store the MAC 126 computed for the EXP 129 in the internal NVM 127, and can use the MAC 126 to determine whether the EXP 129 has been modified since the MAC 126 has been computed. Similarly, the processor 190 may store the MAC 124 computed for the EXP 128 in the external NVM 150, and can use the MAC 124 to determine whether the EXP 129 has been modified since the MAC 124 has been computed.

An image file may comprise binary object code and/or intermediate code. Binary object code typically comprises relocatable format machine code that may not be directly executable by the processor 190 until the binary object code is linked to form an executable file or a library file. The binary object code can comprise machine language or can comprise an intermediate language such as register transfer language (RTL). Binary object code can be distributed in various formats, such as but not limited to the Common Object File Format (COFF) and the Executable and Linkable Format (ELF). The intermediate code can comprise bytecode. Bytecode can also be referred to as portable code, because bytecode is typically platform independent unlike binary object code. The intermediate code is typically executed by an interpreter (or a runtime environment with an ahead-of-time compiler, or a just-in-time compiler) being executed on the computing device 100. The interpreter can directly execute the bytecode without the bytecode being compiled into machine code. In some implementations, the bytecode can be compiled into binary object code by a compiler on the computing device 100 (not shown).

The secure processing subsystem 110 of the computing device 100 can include a secure bootloader 119 stored in a read-only memory (ROM) 105 that is configured to authenticate one or more firmware image files and/or image files for one or more critical software components of the computing device 100 using various secure boot mechanism techniques. The secure bootloader can also be configured to compute the CMAC of the EXP 129 and/or the EXP 128 before allowing the computing device 100 to be booted. If the CMAC value computed by the boot loader does not match an expected CMAC value (e.g. MAC 126 and/or MAC 124) that was previously calculated and associated with the executable program code to be authenticated by the bootloader (e.g., EXP 128 and/or EXP 129), then the secure boot loader can determine that an unauthorized update to software and/or firmware has occurred for the EXP 128 and/or EXP 129.

Figure 2:
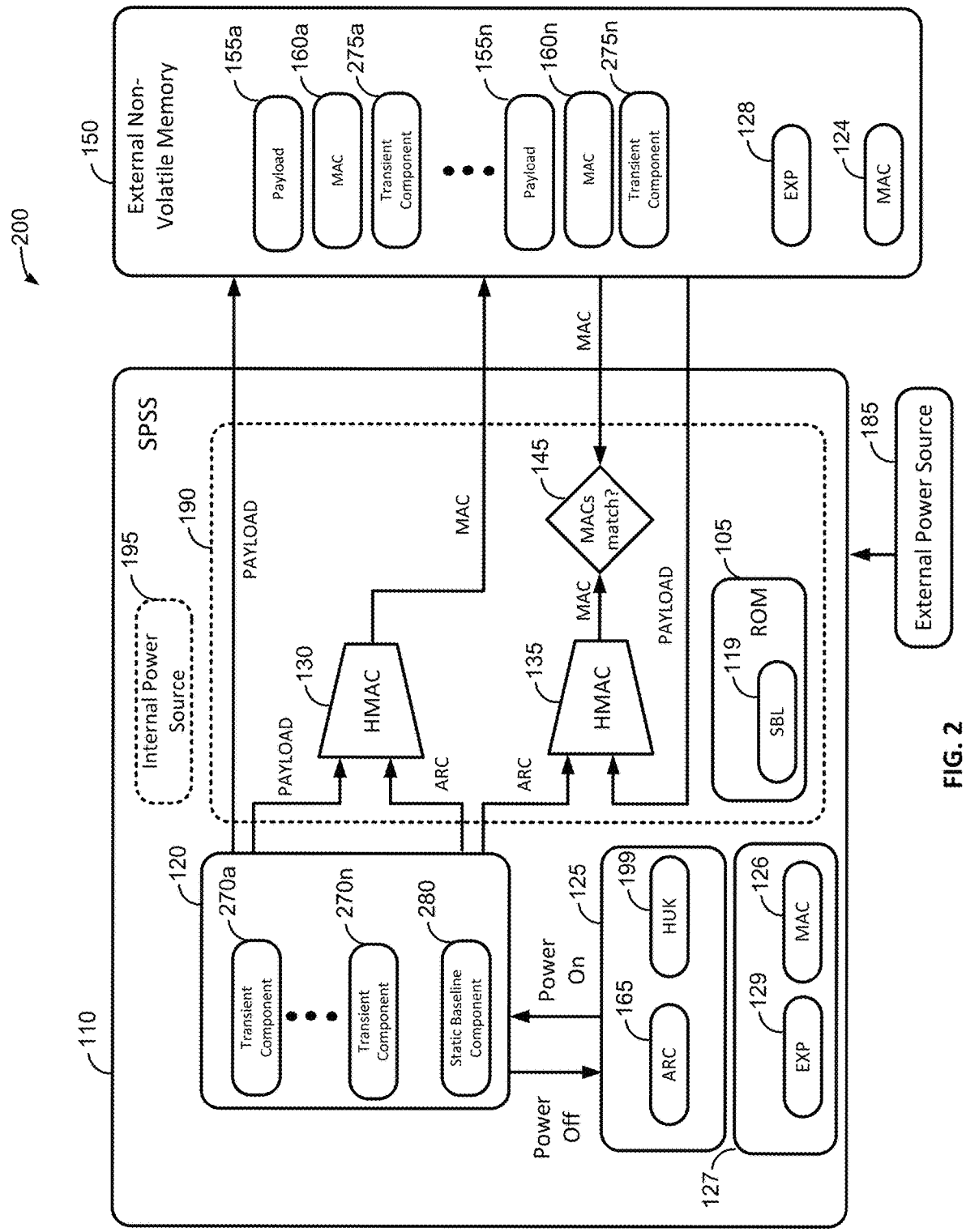
FIG. 2 is a functional block diagram of an alternate implementation of the example computer system illustrated in FIG. 1.

FIG. 2 is a functional block diagram illustrates computing device 200, which is an alternative implementation of the example computing device 100 illustrated in FIG. 1. The example implementation of the computing device 100 illustrated in FIG. 1 is configured to store a single instance of the payload 155 and the MAC 160 in the external NVM 150. FIG. 2 illustrates an alternative implementation in which the computing device 200 can store multiple payloads (e.g., payload 155a-155n) in the NVM 150 with each payload having an associated MAC (e.g. MAC 160a-160n), where a-n represents a range of integer values from 0 through an integer value n. The lower bound of n may be zero if no data is being stored in the NVM 150 that is secured using the techniques disclosed herein, and the upper bound of the value of n may be limited by the amount of memory comprising the volatile memory 120, the size of the NVM 150, and/or other factors.

The techniques employed by the example implementation of the computing device 100 in FIG. 2 differ slightly from the techniques utilized in the example implementation of the computing device 100 in FIG. 1 to facilitate storing multiple payloads (e.g., payloads 155a-155n) and multiple MACs (e.g., MACs 160a-160n) in the NVM 150. One aspect that differs between the example implementation illustrated in FIGS. 1 and 2 is how the ARCs are stored in the volatile memory 120 of the secure processing subsystem 110 versus that describe above with respect to FIG. 1. With respect to the example implementation illustrated in FIG. 1, a single ARC 140 comprising a static baseline component and a transient component can be stored in the volatile memory 120. In contrast, in the implementation illustrated in FIG. 2, multiple ARC values can be maintained for multiple payloads (e.g. payloads 155a-155n) stored in the NVM 150. Each payload 155 can be associated with a different transient component value. The static baseline component 280 of the ARC, once determined, remains the same until the computing device 100 is powered up again, rebooted, or experiences another event that causes the static baseline component to be incremented. In contrast, the transient component of the ARC in the implementation illustrated in FIG. 1 can be updated each time that the payload 155 is written to the NVM 150. In the implementation illustrated in FIG. 2, a separate transient component is associated with each payload 155a-155n written to the NVM 150. The transient component can be incremented each time that a new payload is written to the NVM 150 or one of the existing payloads is updated. FIGS. 4-6 discussed below illustrate various techniques that can be used to increment the transient component of the ARC value(s) maintained by the computing device 100.

In both the implementation illustrated in FIG. 1 and the implementation illustrated in FIG. 2, the value(s) of the transient component(s) associated with the payload(s) is (are) maintained in the volatile memory 120, so that the processor 190 is able to recover the contents of the payload 155 stored in the NVM. For example, the secure processing subsystem 110 can be configured to maintain a lookup table that associates a respective one of the transient components 270a-270n of each payload of the payloads 155a-155n stored in the NVM 150. The lookup table may associate an address of a respective payload 155a-155n stored in the NVM 150 with the ARC (comprising a transient component of the transient components 270a-270n and a static baseline component 280) used to protect that payload 155a-155n. The secure processing subsystem 110 can store the lookup table in the volatile memory 120. The secure processing subsystem 110 can prevent non-trusted software from accessing the lookup table and the ARC information stored therein.

In the implementation illustrated in FIG. 2, the ARC associated with each of the plurality of payloads can share the same static baseline component 280. However, the transient component 270 for a respective payload (represented by the transient components 270a-270n in FIG. 2) can be different for each of the plurality of payloads 155a-155n stored in the NVM 150. The secure processing subsystem 110 can store the multiple transient components (e.g., transient components 270a-270n) in the volatile memory 120 along with the static baseline component 280. Payload data may initially be stored in the volatile memory 120 before being written to the NVM 150. If the static baseline component 280 has not yet been calculated, the processor 190 of the secure processing subsystem 110 can be configured to determine the static baseline component 280 based on the ARC 165 stored in the one-time programmable memory 125.

The static baseline values are stored and utilized slightly differently by the implementations illustrated in FIGS. 1 and 2. In the example, illustrated in FIG. 1, the static baseline component is used to establish the initial value of the ARC 140 stored in the volatile memory 120. In contrast, in the example implementation illustrated in FIG. 2, the static baseline component is initialized as the static baseline component 280 in the volatile memory 120. The processor 190 combines the static baseline component 280 with a respective one of the transient components 270a-270n to determine a respective ARC associated with a respective payload 155a-155n stored in the NVM 150.

The static baseline value for either of the implementations illustrated in FIG. 1 or 2 can be derived from the ARC 165 stored in the one-time programmable memory 125. The static baseline value can be determined when the computing device 100 is rebooted or powered up and before any other firmware or software programs are executed. The ARC 165 is altered when the static baseline value is determined. This approach can thwart a replay attack from being staged where the battery or other external power supply is removed from the computing device 100 or 200 in an attempt to reset the counter value used by the secure processing subsystem 110. This approach can also prevent unauthorized software from executing and obtaining access to sensitive contents of the NVM 150 that were previously encrypted or otherwise protected using the previous value of the ARC stored in the one-time programmable memory 125. The determination of the static baseline value may be performed by a bootloader that is implemented in a read-only memory (ROM) of the processor 190 that cannot be altered by firmware or software updates. The examples illustrated in FIGS. 4-6, which are discussed in detail below, provide examples of how the static baseline can be calculated and how the ARC can be incremented once the static baseline has been updated. Each time that an event occurs which triggers a new static baseline value to be determined, the processor 190 of the secure processing subsystem 110 selects at least one bit that has not been set in the one-time programmable memory 125. The at least one bit can be selected randomly or can be selected using a combinatorial algorithm. The processor 190 sets a value of the selected at least one bit in the one-time programmable memory 125 by blowing the appropriate fuses, antifuses, or other components to increment the ARC 165 stored in the one-time programmable memory 125.

The static baseline component 280 can be maintained in the NVM 150 until at least one triggering event occurs that causes the processor 190 of the secure processing subsystem 110 to update the ARC 165 in the one-time programmable memory 125. These triggering events may be similar to those discussed above with respect to FIG. 1. In some implementations, the secure processing subsystem 110 can write the static baseline component 280 to the one-time programmable memory 125 as the ARC 165. The processor 190 can be configured to combine a transient component 270 with the static baseline component 280 (e.g., as illustrated in FIGS. 4-6) to generate an ARC to be written as the ARC 165 stored in the one-time programmable memory 125. The processor 190 can be configured to select a most recently determined value of the transient component 270 for generating the ARC to be written to the ARC 165 stored in the one-time programmable memory 125 or may select a value of one of the transient components 270a-270n in the volatile memory 120.

In the implementation of the secure processing subsystem 110 illustrated in FIG. 2, the processor 190 can compute a MAC value (e.g., MACs 160a-160n) for each payload (e.g., 155a-155n). The transient component (e.g., transient component 275a-275n) may also be stored with the payload and the MAC. The secure processing subsystem 110 can be configured to optionally write the transient component 270a-270n to the NVM 150 as the transient component 275a-275n along with the payload 155a-155n and the MAC 160a-160n. The secure processing subsystem 110 can be configured to maintain a copy of the transient component 270a-270n in both the volatile memory 120 and store the transient component 275a-275n in the NVM 150. The MAC 160a-160n for a respective one of the payloads 155a-155n can be computed using the ARC associated with that payload 155a-155n, which comprises a union of the bits of the static baseline component 280 and the respective transient component of the transient components 270a-270n associated with the payload 155a-155n. The MAC can be computed using an HMAC algorithm as discussed above with respect to FIG. 1 using at least a portion of the ARC associated with the payload. The processor 190 can recompute the MAC for a respective one of the payloads using the same technique used to compute the MAC stored in the NVM 150 and compare the computed MAC value to the value stored in the NVM 150 to determine whether the payload has been corrupted or manipulated since the payload was written to the NVM 150.

Figure 3:
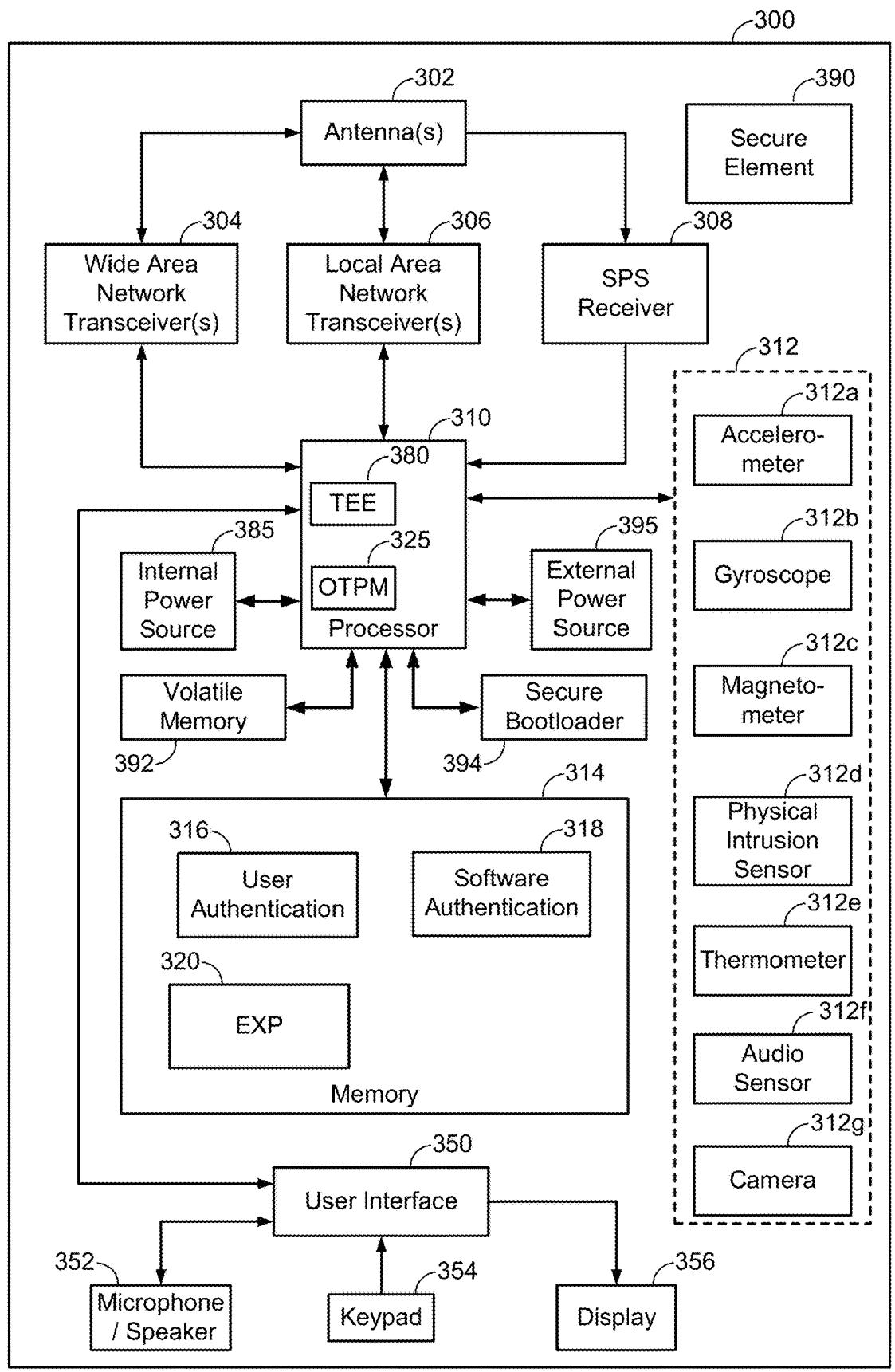
FIG. 3 is a block diagram of an example computer system that can be used to implement the computer systems illustrated in FIGS. 1 and 2.

FIG. 3 is a simplified block diagram of an example computing device 300 that can be used to implement the computing devices 100 and 200 illustrated in FIGS. 1 and 2. FIG. 3 is a schematic diagram illustrating various components of the example computing device 300, which may be similar to or the same as the computing devices 100 and 200 depicted in FIGS. 1 and 2. As illustrated by arrows, the various features/components/functions illustrated in the schematic boxes of FIG. 3 are operatively coupled together, i.e., being directly or indirectly (e.g., via one or more intermediate components) connected. The components of the computing device 300 may be communicably connected to one another via one or more busses (not shown). Other connections, mechanisms, features, functions, or the like, may be provided and adapted as necessary to operatively couple and configure a portable wireless device. Furthermore, one or more of the features or functions illustrated in the example of FIG. 3 may be further subdivided, or two or more of the features or functions illustrated in FIG. 3 may be combined. Additionally, one or more of the features or functions illustrated in FIG. 3 may be excluded.

As shown, the computing device 300 may include one or more local area network transceivers 306 that may be connected to one or more antennas 302. The one or more local area network transceivers 306 comprise suitable devices, circuits, hardware, and/or software for communicating with and/or detecting signals to/from one or more of the Wireless Local Access Network (WLAN) access points, and/or directly with other wireless devices within a network. The local area network transceiver(s) 306 may comprise a WiFi (802.11x) communication transceiver suitable for communicating with one or more wireless access points. Also, or alternatively, the local area network transceiver(s) 306 may be configured to communicate with other types of local area networks, personal area networks (e.g., Bluetooth® wireless technology networks), etc. Additionally, or alternatively, one or more other types of short-range wireless networking technologies may be used, for example, Ultra Wide Band, ZigBee, wireless USB, etc.

The computing device 300 may include one or more wide area network transceiver(s) 304 that may be connected to the one or more antennas 302. The wide area network transceiver 304 may comprise suitable devices, circuits, hardware, and/or software for communicating with and/or detecting signals from one or more of, for example, the WWAN access points and/or directly with other wireless devices within a network. The wide area network transceiver(s) 304 may comprise a CDMA communication system suitable for communicating with a CDMA network of wireless base stations. Also, or alternatively, the wireless communication system may comprise other types of cellular telephony networks, such as, for example, TDMA, GSM, WCDMA, LTE etc. Additionally, or alternatively, one or more other types of wireless networking technologies may be used, including, for example, WiMax (802.16), etc.

In some embodiments, a satellite positioning system (SPS) receiver (also referred to as a global navigation satellite system (GNSS) receiver) 308 may also be included with the computing device 300. The SPS receiver 308 may be connected to the one or more antennas 302 for receiving satellite signals. The SPS receiver 308 may comprise any suitable hardware and/or software for receiving and processing SPS signals. The SPS receiver 308 may request information as appropriate from the other systems, and may perform the computations necessary to determine the position of the computing device 300 using, in part, measurements obtained by any suitable SPS procedure.

The external power source 385 may comprise a battery or other device that can provide electrical power to the components of the computing device 300. The external power source 385 may be removable from the computing device. The external power source 385 may comprise a removable battery or other power source that could be removed by a user of the computing device 300 and swapped for another external power source 385. For example, the user of the computing device 300 may swap the external power source 385 for another external power source 385 as the power source is depleted or the user of the device may wish to force the computing device 300 to reboot.

The computing device 300 may include an internal power source 395. The internal power source 395 can be used as a secondary power source that can provide power the processor 310, or at least to components of the processor 310 such as the TEE 390 and/or the one-time programmable memory 325, the volatile memory 392, and the memory 314 in the event that power from the external power source 385 is lost or that a level of power provided by the external power source 385 falls below a level that would enable the processor 310 to operate. The internal power source 395 can comprise a capacitor, a battery, or other device that can store electrical power that can power the processor 310, and the memory 314 for at least a short period of time in the event that power from the external power source 385 is lost. The internal power source 395 can be configured to provide the processor 310 with sufficient power to write the current anti-replay counter (ARC) values (e.g., ARC 140, transient components 270a-270n, and/or static baseline component 280) stored in the volatile memory 392 to the one-time programmable memory 325 so that the ARC value is not lost due to the computing device 300 losing power.

As further illustrated in FIG. 3, the example computing device 300 includes one or more sensors 312a-312g coupled to a controller/processor 310. For example, the sensors 312a-312g may include motion sensors to provide relative movement and/or orientation information (which is independent of motion data derived from signals received by the wide area network transceiver(s) 304, the local area network transceiver(s) 306, and/or the SPS receiver 308). By way of example but not limitation, the motion sensors may include an accelerometer 312a, a gyroscope 312b, and a geomagnetic (magnetometer) sensor 312c (e.g., a compass), any of which may be implemented based on micro-electro-mechanical-system (MEMS), or based on some other technology. The one or more sensors 312a-312g may further include a physical intrusion sensor 312d, a thermometer (e.g., a thermistor) 312e, an audio sensor 312f (e.g., a microphone) and/or other sensors. The output of the one or more sensors 312a-312g may be provided as part of the data (along with antenna information for nodes communicating with the computing device 300 and/or with such data as location data) transmitted to a remote device or server (via the wide area network transceiver 304 and/or the local area network transceivers 306, or via some network port or interface of the computing device 300), for storage or further processing (e.g., antenna information for an AP communicating with the computing device 300 may be inferred by matching sensor data measured by the sensors of the mobile device with records that are maintained at the server and that include antenna information for various wireless nodes and associated sensor data that was previously obtained by one or more wireless devices). As further shown in FIG. 3, in some embodiments, the one or more sensors 312a-312g may also include a camera 312g (e.g., a charge-couple device (CCD)-type camera, a CMOS-based image sensor, etc.), which may produce still or moving images (e.g., a video sequence) that may be displayed on a user interface device, such as a display or a screen, and that may be further used to determine an ambient level of illumination and/or information related to colors and existence and levels of UV and/or infra-red illumination.

The physical intrusion sensor can be configured to output a signal responsive to detecting physical tampering with the computing device 300. Physical tampering with the computing device 100 may indicate that a user of the computing device 300 is attempting to remove the battery or other external power source of the computing device 300, and a power loss to the secure processing system may be imminent. The processor 310 can be configured to monitor for signals from the physical intrusion sensor 312d and to write the ARC from the volatile memory 392 to the one-time programmable memory responsive to such a signal from the physical intrusion sensor 312d. The physical intrusion sensor may be included where the secure processing subsystem does not include a secondary internal power source, such as internal power source 195, to provide power in the event that the external power source is removed from the computing device 300.

The physical intrusion sensor 312d can comprise a mechanical switch that is triggered if a case of the computing device 300 is opened or a compartment in which the external power source 185 is disposed is opened, and is configured to generate a signal responsive to the case or compartment having been opened. The physical intrusion sensor 312d can also comprise a light sensor that can detect light entering the computing device 300 if a case of the computing device 300 is opened or a compartment in which the external power source 185 is disposed is opened, and can generate a signal indicative of the change in light level. The physical intrusion sensor 312d can also comprise a capacitive sensor that is configured to generate a signal responsive to a user of the computing device 300 touching the physical intrusion sensor 312d or being proximate to the sensor location, which may indicate that the user may remove the external power source 185 from the computing device 300. Other types of sensors can also be used to generate a signal responsive to an event that may indicate that the external power source 185 of the computing device 300 may be removed.

The processor(s) (also referred to as a controller) 310 may be connected to the local area network transceiver(s) 306, the wide area network transceiver(s) 304, the SPS receiver 308 and the one or more sensors 312. The processor may include one or more microprocessors, microcontrollers, and/or digital signal processors that provide processing functions, as well as other calculation and control functionality. The processor 310 may be coupled to non-transitory computer readable storage media (e.g., memory 314) for storing data and software instructions for executing programmed functionality within the mobile device. The memory 314 may be on-board the processor 310 (e.g., within the same IC package), and/or the memory may be external memory to the processor and functionally coupled over a data bus. The memory 314 can comprise non-volatile computer readable media that can be used by the processor 310 to store executable program code, which can be used to implement the NVM 150 of the computing devices illustrated in FIGS. 1 and 2. The processor 310 may also be coupled to volatile memory 392, which can be used implement the volatile memory 120 of the computing devices illustrated in FIGS. 1 and 2. The volatile memory 392 comprises computer-readable memory that will lose the contents stored therein when power is lost to the memory. The processor 310 can also include non-volatile memory (not shown), which can be used to implement the NVM 127 of the computing devices illustrated in FIGS. 1 and 2, and which can be used to store executable program code, such as EXP 129.

A number of software units and data tables may reside in memory 314 and may be utilized by the processor 310 in order to manage both communications with remote devices/nodes, perform positioning determination functionality, and/or perform device control functionality. As illustrated in FIG. 3, in some embodiments, the memory 314 may include a user authentication unit 316 and a software authentication unit 318. The functionality of the units and/or data structures may be combined, separated, and/or be structured in different ways depending upon the implementation of the computing device 300. For example, the user authentication unit 316 and/or the software authentication unit 318 may each be realized, at least partially, as a hardware-based implementation. The memory 314 may also include executable program code (EXP) 320 that can be used to implement one or more applications, services, programs, etc. on the computing device 300. The EXP 320 can be executed by the processor 310 and can be used to implement the EXP 128 stored in the NVM 150 of the computing devices illustrated in FIGS. 1 and 2.

The user authentication unit 316 and/or the software authentication unit 318 may be processes running on the processor 310 of the computing device 300. The user authentication unit 316 can be configured to authenticate a user of the computing device 300 using various means. The user authentication unit 316 can be configured to authenticate the user by requiring that the user input a password, PIN, swipe pattern, or other such input that should only be known to an authorized user of the computing device. The user authentication unit 316 can be configured to authenticate the user using biometric data obtained from one or more of the sensors 312. The computing device 300 can include a sensor configured to scan one or more physical characteristics of the user of the computing device 300, such as a sensor configured to capture an image of the user's iris and/or retina, facial features, and/or other anatomical information that may be used to authenticate the user of the computing device 300. The sensors 312a-312g of the mobile device can also include a sensor configured to collect voice data for the user that can be analyzed by the processor 190 to determine whether characteristics of a voice of a current user of the computing device 300 matches the characteristics of the voice of an authorized user of the mobile device. If the user of the computing device 300 is determined not to be an authorized user of the computing device 300, the user authentication unit 316 can be configured to provide an indication to the processor 310 that the user of the computing device is not an authorized user of the computing device 300. The processor 310 can be configured to corrupt an ARC stored in the one-time programmable memory 325 and to clear any ARC components stored in the volatile memory 392 in response to such an indication.

The software authentication unit 318 can be configured to authenticate updates to firmware and/or software of the computing device 300. As discussed with respect to FIG. 1, software and/or firmware updates may be received as one or more image files. The updates to the firmware and/or software can be received from various sources. Legitimate sources of firmware and/or software may include, but are not limit to, original equipment manufacturers (OEMs), operating system and/or device driver providers, network providers and/or enterprise providers that have subsidized a device and/or exert control over the disposition and/or the configuration of the device. Malicious parties may attempt to obtain control over the computing device 300 by attempting to install or by deceiving a user of the device to install malicious firmware and/or software updates on the device.

The software authentication unit 318 can be configured to authenticate updates to firmware and/or software associated with the computing device 300. The usage of the term "associated with" in this context refers to software and/or firmware that is installed in a non-volatile memory of the computing device 300, and may be loaded into a volatile memory 392 for execution by the processor 310 of the computing device 300. The software and/or firmware may be trusted firmware or software that may be executed by the TEE 380.

The software authentication unit 318 can be configured to use a HUK, such as the HUK 199 discussed above with respect to FIGS. 1 and 2, to compute a MAC value associated with the software being update and compare that value to a MAC value included with the image file that includes the firmware and/or software update. If the computed MAC value and the value from the image file do not match, then the software authentication unit 318 can be configured to generate an indication to the processor 310 that the update was not authenticated. The processor 310 can be configured to corrupt an ARC stored in the one-time programmable memory 325 and to clear any ARC components stored in the volatile memory 392 in response to such an indication.

The processor 310 may include a trusted execution environment (TEE) 380 and/or the computing device 300 may include a secure element 390. The trusted execution environment 380 and/or the secure element 390 can be used to implement the secure processing subsystem 110 illustrated in FIG. 1, and the external NVM 150 may be implemented by the memory 314 or another memory of the computing device 300 (not shown).

The processor 310 may also include a trusted execution environment 380. The trusted execution environment 380 can be implemented as a secure area of the processor 310 that can be used to process and store sensitive data in an environment that is segregated from the rich execution environment in which the operating system and/or applications (such as those of the software authentication unit 318) may be executed. The trusted execution environment 380 can be configured to execute trusted applications that provide end-to-end security for sensitive data by enforcing confidentiality, integrity, and protection of the sensitive data stored therein. The trusted execution environment 380 can be used to store encryption keys, anti-replay counter data, and/or other sensitive data. The processor 310 can also comprise one-time programmable memory that can be used to implement the one-time programmable memory 125 of the computing device 100 illustrated in FIGS. 1 and 2.

The processor 310 may also include one-time programmable memory 325, which can implement the one-time programmable memory 125 of the computing devices 100 and 200 illustrated in FIGS. 1 and 2. The one-time programmable memory 325 comprises a persistent memory that retains the data stored therein even if power to memory is lost. The one-time programmable memory 325 can comprise a plurality of fuses that each represent a bit of data, and the value of a particular bit can be set by blowing the corresponding fuse. The value of a fuse, once set, cannot be changed. Furthermore, other types of one-time programmable memory 325 may be used. The one-time programmable memory 325 may comprise antifuses or other components that can be set once and that can be used to represent a bit of data instead of fuses.

The computing device 300 may include a secure element 390 (also referred to herein as a trusted component). The computing device 300 may include the secure element 390 in addition to or instead of the trusted execution environment 380. The secure element 390 can comprise autonomous and tamper-resistant hardware that can be used to execute secure applications and the confidential data associated with such applications. The secure element 390 can be used to store encryption keys, anti-replay counter data, and/or other sensitive data. The secure element 390 can also comprise one-time programmable memory that can be used to implement the one-time programmable memory 125 of the computing devices illustrated in FIGS. 1 and 2. The secure element 390 can comprise a Near Field Communication (NFC) tag, a Subscriber Identity Module (SIM) card, or other type of hardware device that can be used to securely store data. The secure element 390 can be integrated with the hardware of the computing device 300 in a permanent or semi-permanent fashion or may, in some implementations, be a removable component of the computing device 300 that can be used to securely store data and/or provide a secure execution environment for applications.

The computing device 300 may further include a user interface 350 providing suitable interface systems, such as a microphone/speaker 352, a keypad 354, and a display 356 that allows user interaction with the computing device 300. The microphone/speaker 352 (which may be the same or different from the audio sensor 3120 provides for voice communication services (e.g., using the wide area network transceiver(s) 304 and/or the local area network transceiver(s) 306). The keypad 354 may comprise suitable buttons for user input. The display 356 may include a suitable display, such as, for example, a backlit liquid crystal display (LCD), and may further include a touch screen display for additional user input modes.

The processor 190 of computing devices illustrated in FIGS. 1 and 2 or the processor 310 of the computing device 300 provide means for means for determining that an unauthorized update has been made to software or firmware associated with the integrated circuit and means for corrupting an anti-replay counter (ARC) value, maintained in a one-time programmable memory of the integrated circuit and used by the integrated circuit to protect contents of a non-volatile memory, responsive to determining that the unauthorized update has been made to the software or the firmware as discussed above with respect to the FIGS. 1-3.

The processor 190 or 310 provide the means for determining that the unauthorized update has been made to the software or the firmware comprises which include means for detecting a change to the software on the integrated circuit; means for determining whether at least one of a user or the software is authentic in response to detecting the change to the software on the integrated circuit; and means for determining that the change to the software on the integrated circuit was unauthorized in response to the at least one of the user or the software not being authentic. The user authentication unit 316 and/or the software authentication unit 318 also provide means for determining whether at least one of a user or the software is authentic in response to detecting the change to the software on the integrated circuit. The processor 190 and the processor 310 also provide means for determining whether the user has been authenticated and means for performing at least one authentication procedure to authenticate the user in response to the user not having been authenticated. The user authentication unit 316 can also provide the means for determining whether the user has been authenticated and means for performing at least one authentication procedure to authenticate the user in response to the user not having been authenticated.

The processor 190 or the processor 310 provide means for authenticating the software that includes means for determining a message authentication code (MAC) for the software by applying a cipher-based message authentication code (CMAC) algorithm to the software using a key derived from a Hardware Unique Key (HUK) associated with the integrated circuit, and means for comparing the MAC with a previously determined MAC to determine whether the MAC matches the previously determined MAC. The user authentication unit 316 can also provide the means for determining a message authentication code (MAC) for the software by applying a cipher-based message authentication code (CMAC) algorithm to the software using a key derived from a Hardware Unique Key (HUK) associated with the integrated circuit, and the means for comparing the MAC with a previously determined MAC to determine whether the MAC matches the previously determined MAC.

The processor 190 or the processor 310 provide the means for corrupting the ARC value which includes means for updating a first ARC value stored in the one-time programmable memory with a second ARC value maintained in volatile memory of the integrated circuit. The processor 190 or 310 also provide means for determining a first number of bits of the one-time programmable memory to be set, means for determining locations of a first set of bits of the one-time programmable memory comprising the first number of bits, and means for updating the ARC value stored in the one-time programmable memory by setting the first set of bits of the one-time programmable memory. The processor 190 or the processor 310 also provide means for determining the first number of bits of the one-time programmable memory including means for determining the first number of bits of the one-time programmable memory to set based on a second number of bits already set in the one-time programmable memory. The processor 190 or the processor 310 also provide means for determining which bits of the one-time programmable memory which includes means for randomly selecting the first set of bits of the one-time programmable memory from a second set of bits that have not been set in the one-time programmable memory.

FIGS. 4-6 illustrate example fuse maps 405, 410, 415, 420, 425, 430 that may be used to represent the ARC, which can comprise ARC 140 in FIG. 1 or the transient components 270a-270n and the static baseline component 280 in FIG. 2, stored in the volatile memory 120. In the example implementation illustrated in FIG. 1, a single ARC 140 is stored in the volatile memory 120. In contrast, in the example implementation illustrated in FIG. 2, multiple ARCs comprising a transient component and a static baseline component are stored in the volatile memory for each of the payloads 155a-155n that are stored in the NVM 150. Each ARC is composed of a static baseline component 280, which is shared by all of the ARCs, and a transient component 270a-270n that is specific to a particular payload 155a-155n in the NVM 150.

Each fuse map initially represents an array of bit values that represent whether a particular fuse, antifuse, or other component associated with that bit has been blown in the one-time programmable memory 125. Fuse maps may be represented using one-dimensional or multi-dimensional arrays, here with the fuse maps 405, 410, 415, 420, 425, 430 being two-dimensional arrays. The fuse maps can be stored in the volatile memory 120, and the processor 190 can be configured to access the volatile memory 120 each time that data is to be written to the external NVM 150 and to increment the ARC stored in the volatile memory 120. At least a portion of the updated ARC can be used to determine the MAC 160 that can be used to determine that the payload 155 (the data written to the external NVM 150) has not been modified since the data was written to the external NVM 150. In the implementation illustrated in FIG. 2, each payload 155a-155n is associated with its own respective MAC 160a-160n and transient component 275a-275n. A respective transient component 275a-275n can be combined with the static baseline component 280 to determine the MAC 160a-160n for the respective payload 155a-155n with which the respective transient component 275a-275n is associated.

These techniques can be used to prevent replay attacks since the ARC is used to generate the MAC. If an attacker were to introduce a copy of an old MAC and payload 155 into the external NVM 150, the secure processing subsystem 110 would recognize that the payload 155 has been modified or corrupted, because the MAC 160 stored with the payload 155 would not match an expected value of the MAC computed for the payload. The secure processing subsystem 110 can calculate the MAC of the payload 155 using the current ARC and compare that MAC value to the MAC 160. If the two MACs do not match, the data in the external NVM 150 has been corrupted or modified.

FIG. 4 is a diagram illustrating fuse maps for a nonce-based technique for maintaining an anti-replay counter (ARC) according to the techniques disclosed herein. The technique illustrated in FIG. 4 can be implemented by the computing devices 100 and 200 illustrated in FIGS. 1 and 2. The technique illustrated in FIG. 4 is illustrated using a series of fuse maps: fuse map 405, fuse map 410, fuse map 415, fuse map 420, fuse map 425, and fuse map 430 that represent an array of fuses in the one-time programmable memory 125 of the secure processing subsystem 110. Each square in a fuse map represents one fuse or antifuse which can be blown to set a corresponding bit value. Bit values that have already been set are represented by the number "1" in that square. However, the bit values could be represented by a bit value of zero in other implementations. The shading of the square represents how that particular bit was set. In the example illustrated in FIG. 4, a square having a solidly shaded background indicates that the bit was set as part of the static baseline value associated with the (ARC), a square having a background shaded with a checkerboard pattern indicates that the bit was set in addition to the static baseline that has been selected to prevent a rollback attack, and a square having a background shaded with a diamond pattern indicates that the bit was set as part of a random selection.

The technique illustrated in FIG. 4 can reduce the number of fuses that are used to maintain the ARC in the one-time programmable memory 125. As discussed above, the ARC can be maintained in the volatile memory 120 of the secure processing subsystem 110 while the computing device 100 is receiving power from a battery or other power source. The ARC stored in the volatile memory 120 can be incremented each time that data is written to external NVM 150. When the power source has been depleted and/or when the physical intrusion sensor 312d detects physical intrusion into the computing device 100 which may indicate that the battery or other power source may be removed from the computing device 100, the ARC maintained in the volatile memory 120 can be written to the one-time programmable memory 125 of the secure processing subsystem 110. The storage capacity of the one-time programmable memory 125 of the secure processing subsystem 110 is typically limited in size and is finite. The number of fuses included in the one-time programmable memory 125 of the secure processing subsystem 110 can be limited due to cost and size limitations of the integrated circuit on which the secure processing subsystem 110 is implemented. Furthermore, the one-time programmable memory 125 can only be programmed once, and thus, cannot be reused like other types of memory that may be used in a computing device.

The process illustrated in FIG. 4 can begin when the computing device 100 is powered up. At the time that the computing device 100 was powered down, a baseline value for the ARC may have been written to the fuses of the one-time programmable memory 125. The processor 190 of the secure processing subsystem 110 can be configured to access the one-time programmable memory 125 and to read the ARC 165 stored therein at the time that the computing device 100 is powered up. The fuse map 405 represents a 6×6 array of fuses comprising an ARC baseline value that has been previously written to the one-time programmable memory 125. The size and configuration of the fuse map illustrated in the examples of FIG. 4 are intended to illustrate the processes that are being disclosed herein and are not intended to limit these processes to a fuse map of a specific size or configuration. Other sizes and/or configurations (e.g., different numbers of rows and/or columns) of fuse maps may be used. The number of fuses or antifuses included in the one-time programmable memory 125 of the secure processing subsystem 110 can be different (e.g., greater or fewer) than the example illustrated in FIG. 4. The techniques illustrated in FIGS. 4-6 provide ways of storing an ARC in the limited number of fuses available in the one-time programmable memory 125 so that the limited supply of fuses is not exhausted in a small number of power cycles or physical intrusion events which trigger the ARC to be written to the one-time programmable memory 125.

The example fuse map 405 has 4 bits which were previously set as a static baseline value. The static baseline value may have been determined using one of the techniques illustrated in FIGS. 4-6 or may have been a selected seed value that was initially used as an ARC. The portion of the one-time programmable memory 125 used to store the ARC may have initially been blank, with no fuses or antifuses blown, initially and the static baseline value stored illustrated in fuse map 405 may have represented a previous value of the ARC that was written to the one-time programmable memory 125 from the volatile memory 120. The processor of the secure processing subsystem 110 can access the one-time programmable memory 125, read the fuse map values from the one-time programmable memory 125, and store a representation of the fuse map in the volatile memory 120 of the secure processing subsystem 110.

After loading the previous baseline value from the one-time programmable memory 125, the processor 190 of the secure processing subsystem 110 can select at least one bit to add to the previous baseline as illustrated in the fuse map 410 compared to the fuse map 405. The processor 190 can be configured to randomly select the at least one bit from bits of the fuse map that have not yet been set. The processor can be configured to blow the fuses associated with the one or more bits that have been selected in the one-time programmable memory 125 to establish a new static baseline value. The new baseline value prevents a replay attack where an attacker attempts to place old data into the external NVM 150 and have the secure processing subsystem 110 process the old data. Referring to the example illustrated in FIG. 1, the data stored in the external NVM 150 includes a payload 155 and a MAC 160. The MAC 160 can be recalculated for the payload 155 using the current ARC stored in the volatile memory 120. The value of the recalculated MAC and the MAC 160 will no longer match if old data is placed into the external NVM 150, because the ARC maintained in the volatile memory 120 is incremented each time data is written to the external NVM 150.

Fuse map 410 also illustrates another aspect of the process. At least one additional bit is selected by the processor 190 as a random selection component of the ARC. The at least one bit is selected from fuses that have not been set in the fuse map stored in the volatile memory 120. In the example illustrated in FIG. 4, the random component includes three bits, but the random component may include a greater or fewer number of bits. The random selection is selected again each time data is written to the external NVM 150. The random selection portion of the ARC is not written to the fuses of the one-time programmable memory 125. The random selection portion is maintained only in the representation of the fuse map stored in the volatile memory 120.

Fuse map 415 illustrates an example of the fuse map 405 in the volatile memory 120 having been updated in response to data being written to the external NVM 150. The updated static baseline value includes the at least one bit that was added to the static baseline retrieved from the one-time programmable memory 125. But, the randomly selected portion of the ARC is replaced by a new random selection of one or more bits. In the example illustrated in fuse map 415, three bits were randomly selected from the bits of the fuse map that were not part of the updated static baseline. A greater or fewer number of bits can be selected from the available bits that are not part of the updated static baseline each time that the random component of the ARC is redetermined when data is written to the external NVM 150.

The fuse map 420 illustrates an example of the fuse map 415 in the volatile memory 120 having been updated in response to data being written to the external NVM 150. Once again, a new random selection of bits from the fuse map are selected from the bits that are not part of the updated static baseline. In the example illustrated in fuse map 420, four bits were selected from the available bits, but a greater or fewer number of bits can be selected from the available bits that are not part of the updated static baseline each time that the random component of the ARC is redetermined when data is written to the external NVM 150.

The processor 190 determines the power source has been depleted and/or determines that the physical intrusion sensor 312d has detected physical intrusion into the computing device 100. The processor then accesses the current fuse map in the volatile memory 120 and writes those values to the fuses of the one-time programmable memory 125 as the new static baseline value. In the example of FIG. 4, the fuse map in the volatile memory 120 was in the state illustrated by fuse map 420. The fuses set in this map will become the new static baseline value that is written to the one-time programmable memory 125 by the processor as represented by fuse map 425.

Fuse map 430 illustrates an example fuse map in the volatile memory 120 in which the static baseline illustrated in fuse map 425 has been updated to include an additional bit. The processor 190 can write the additional bit to the fuses of the one-time programmable memory 125. The processor can also select a set of one or more randomly selected bits that includes bits from the fuse map in the non-volatile memory that are not part of the updated static baseline. This process of selecting a new random component to the ARC can occur each time that data is written to the external NVM 150, and can continue until an event triggers the processor to write the current fuse map from the volatile memory 120 into the fuses comprising the one-time programmable memory 125.

FIG. 5 is a diagram illustrating another technique for maintaining an anti-replay counter according to the techniques disclosed herein. The technique is similar to that illustrated in FIG. 4, but uses a partially randomized approach in which the portion of the ARC that is added to the static baseline component can be randomly selected while the transient component of the ARC is determined using a combinatorial approach. The technique illustrated in FIG. 5 is illustrated using a series of fuse maps: fuse map 505, fuse map 510, fuse map 515, fuse map 520, and fuse map 525 that represent an array of fuses in the one-time programmable memory 125 of the secure processing subsystem 110. In the example illustrated in FIG. 5, a square having a solidly shaded background indicates that the bit was set as part of the static baseline value associated with the (ARC), a square having a background shaded with a checkerboard pattern indicates that the bit was set an addition to the static baseline that has been selected to prevent a rollback attack, and a square having a background shaded with a diamond pattern indicates that the bit was set as part of a combinatorial selection component of the transient component of the ARC.

The process illustrated in FIG. 5 can begin when the computing device 100 is powered up like that of the process of FIG. 4 discussed above. At the time that the computing device 100 was powered down, a baseline value for the ARC may have been written to the fuses of the one-time programmable memory 125. The processor of the secure processing subsystem 110 can access the one-time programmable memory 125, read the fuse map values from the one-time programmable memory 125, and store a representation of the fuse map in the volatile memory 120 of the secure processing subsystem 110 to generate the fuse map 505. The fuse map 505 is identical to that of fuse map 1005 discusses above, but the process could start with a different static baseline or no static baseline value at all as discussed above with respect to FIG. 4.

A new static baseline value can also be determined as discussed above with respect to FIG. 4. The processor of the secure processing subsystem 110 can select at least one bit to add to the previous baseline as illustrated in fuse map 510. The processor can be configured to randomly select the at least one bit from bits of the fuse map that have not yet been set. The processor can be configured to blow the fuses associated with the one or more bits that have been selected in the one-time programmable memory 125 to establish a new static baseline value. The static baseline value stored in the one-time programmable memory 125 may initially start with no bits set.

Fuse map 510 also illustrates another aspect of the process. At least one additional bit is selected as a combinatorial selection component of the ARC. The combinatorial selection component of the ARC illustrated in FIG. 5 differs from the random selection component of the ARC illustrated in FIG. 4. The combinatorial selection component is not a randomly selected set of bits. Instead, a starting point is selected in the bit map. The starting point may be any bit from the fuse map that has not yet been selected. For example, the bit in the bottom right hand corner of the fuse map has been a selected in the example fuse map 510, but any bit that has not yet been set may be selected.

The technique illustrated in FIG. 5 minimizes the number of bits that are selected for the combinatorial selection component of the ARC each time that the ARC is incremented before writing data to the external NVM 150. For example, the process illustrated in FIG. 5 can iterate through each of the possible combinations where the combinatorial selection component comprises 1-bit. Once the 1-bit options have been exhausted, the process can iterate through each of the 2-bit options until the 2-bit options have been exhausted. This process can continue, adding another bit as each of the series n-bit options are exhausted, until all possible combinations are exhausted or until the ARC is written to the one-time programmable memory 125. The monotonic selection portion of the ARC is not written to the fuses of the one-time programmable memory 125 until an event triggers the processor to write the current fuse map from the volatile memory 120 into the fuses comprising the one-time programmable memory 125. The monotonic selection portion is maintained only in the representation of the fuse map stored in the volatile memory 120 until such a write event occurs.

Fuse map 515 illustrates an example illustrated how the fuse map 510 could change after data has been written to the external NVM 150 eight times. The combinatorial selection component of the ARC has increment by eight bits. All of the 1-bit options have not yet been exhausted. In the example of FIG. 5, the ARC increments from left to right and from bottom to top, but other algorithms could be used to determine the order in which the various permutations of the combinatorial selection component are visited.

Fuse map 520 illustrates an example illustrated how the fuse map 515 could change after data has been written to the external NVM 150 thirty-two times. The combinatorial selection component of the ARC has increment by thirty-two bits. All of the 1-bit options have been exhausted, and the process continues with a 2-bit combinatorial selection component of the ARC. In the example of FIG. 5, the ARC increments from left to right and from bottom to top, but other algorithms could be used to determine the order in which the various permutations of the combinatorial selection component are visited.

The processor then determines the power source has been depleted and/or determines that the physical intrusion sensor 312d has detected physical intrusion into the computing device 100. The processor then accesses the current fuse map in the volatile memory 120 and writes those values to the fuses of the one-time programmable memory 125 as the new static baseline value. In the example of FIG. 5, the fuse map in the volatile memory 120 was in the state illustrated by fuse map 520. The fuses set in this map will become the new static baseline value that is written to the one-time programmable memory 125 by the processor as represented by fuse map 525.

FIG. 6 is a diagram illustrating another technique for maintaining an anti-replay counter according to the techniques disclosed herein. The technique is similar to that illustrated in FIGS. 4 and 5, but uses a deterministic combinatorial approach to determine the portion of the ARC that is added to the static baseline component as well as the transient component of the ARC. The technique illustrated in FIG. 6 is illustrated using a series of fuse maps: fuse map 605, fuse map 610, fuse map 615, fuse map 620, fuse map 625, and fuse map 630, that represent an array of fuses in the one-time programmable memory 125 of the secure processing subsystem 110. In the example illustrated in FIG. 6, a square having a solidly shaded background indicates that the bit was set as part of the static baseline value associated with the (ARC), a square having a background shaded with a checkerboard pattern indicates that the bit was set an addition to the static baseline that has been selected to prevent a rollback attack, and a square having a background shaded with a diamond pattern indicates that the bit was set as part of a combinatorial component of the ARC.

The technique illustrated in FIG. 6 uses a combinatorial approach to determine a combinatorial component of the ARC that is added to the static baseline component of the ARC. The number of bits that are included in the combinatorial component can vary depending on how often the device may be powered off. The techniques illustrated in FIG. 6 may reduce the number of fuses of the one-time programmable memory 125 are written to for each power-down cycle when compared to the techniques illustrated in FIGS. 4 and 5. The technique is similar to that of FIG. 5, but each of the updates to the fuse map in technique illustrated in FIG. 6 are deterministic and no random selection of bits are made in the technique of FIG. 6.

The technique illustrated in FIG. 6 uses a combinatorial approach to determine a combinatorial component of the ARC that is added to the static baseline component of the ARC. The number of bits that are included in the combinatorial component can vary depending on how often the device may be powered off. The techniques illustrated in FIG. 6 may reduce the number of fuses of the one-time programmable memory 125 are written to for each power-down cycle when compared to the techniques illustrated in FIGS. 4 and 5. The technique is similar to that of FIG. 5, but each of the updates to the fuse map in technique illustrated in FIG. 6 are deterministic and no random selection of bits are made in the technique of FIG. 6.

The combinatorial component of the ARC is a deterministic selection of X bits among the available bits of the one-time programmable memory 125 that have not been set as part of the static baseline. The combinatorial component of the ARC is determined for each write of data to the external NVM 150. The available bits that can be included in the combinatorial component and the total number of available bits can be determined using the following equations:

Available Bits=Max Bits−Bits in Static Baseline, where the max number of bits represents the total number of bits comprising the portion of the one-time programmable memory 125 represented by the fuse map, and where the bits in the static baseline represents the fuses that have been blown in the updated static baseline value in which at least one additional bit has been blown (as illustrated in fuse map 610). Thus, the available bits are those bits that have not yet been set and could be included in the combinatorial component of the ARC.

Number of Available Bits=Max Number of Bits−Number of Bits in Static Baseline, where the max number of bits represents the total number of bits comprising the portion of the one-time programmable memory 125 represented by the fuse map, and where the number of bits in the static baseline represents the number of fuses that have been blown in the updated static baseline value in which at least one additional bit has been blown (as illustrated in fuse map 610). Thus, the number available bits are those bits that have not yet been set and the total number of bits that could be included in the combinatorial component of the ARC.

The process illustrated in FIG. 6 can begin when the computing device 100 is powered up like that of the process of FIGS. 4 and 5 discussed above. At the time that the computing device 100 was powered down, a baseline value for the ARC may have been written to the fuses of the one-time programmable memory 125. The processor of the secure processing subsystem 110 can access the one-time programmable memory 125, read the fuse map values from the one-time programmable memory 125, and store a representation of the fuse map in the volatile memory 120 of the secure processing subsystem 110 to generate the fuse map 605. The process could start with a different static baseline or no static baseline value at all depending on whether the techniques discussed herein have been used yet to generate and maintain an ARC.

A new static baseline value can also be determined as discussed above with respect to FIGS. 4 and 5. The processor of the secure processing subsystem 110 can select at least one bit to add to the previous baseline as illustrated in fuse map 610. The processor can select at least one bit from the available bits of the fuse map using the deterministic approach (in contrast with the approaches illustrated in FIGS. 4 and 5 in which the at least one bit added to the static baseline value may be randomly selected). The processor can be configured to blow the fuses associated with the one or more bits that have been selected in the one-time programmable memory 125 to establish a new static baseline value. The static baseline value stored in the one-time programmable memory 125 may initially start with no bits set.

Fuse map 615 illustrates an example illustrated how the fuse map 610 could change after data has been written to the external NVM 150 once following the updated static baseline being determined. In the example illustrated in fuse map 615, the combinatorial portion of the ARC comprises one additional bit at this stage. The size ('X') of the combinatorial portion of the ARC grows in 1-bit increments once all of the combinations of bits comprising X bits has been exhausted. In the example illustrated in FIG. 6, the deterministic combinatorial algorithm increments from left to right and from bottom to top, but other implementation of the deterministic combinatorial algorithm can be configured to increment through the various permutations of X bit combinations in a different order than the one illustrated in FIG. 6. For example, the process illustrated in FIG. 6 can iterate through each of the possible combinations where the combinatorial selection component comprises 1-bit. Once the 1-bit options have been exhausted, the process can iterate through each of the 2-bit options until the 2-bit options have been exhausted. This process can continue, adding another bit as each of the series n-bit options are exhausted, until all possible combinations are exhausted or until the ARC is written to the one-time programmable memory 125. The combinatorial selection portion of the ARC is not written to the fuses of the one-time programmable memory 125 until an event triggers the processor to write the current fuse map from the volatile memory 120 into the fuses comprising the one-time programmable memory 125. The monotonic selection portion is maintained only in the representation of the fuse map stored in the volatile memory 120 until such a write event occurs.

Fuse map 620 illustrates an example illustrated how the fuse map 610 could change after data has been written to the external NVM 150 numerous times following the state of the fuse map illustrated in fuse map 615. In the example illustrated in fuse map 625, all of the 1-bit options for the combinatorial portion of the ARC have been exhausted and the combinatorial algorithm is now iterating through 2-bit options, which will be used to determine the combinatorial portion of the ARC each time data is written to the external NVM 150. The 2-bit options will be explored until exhausted.

Fuse map 625 illustrates an example illustrated how the fuse map 610 could change after data has been written to the external NVM 150 numerous times following the state of the fuse map illustrated in fuse map 620. In the example illustrated in fuse map 625, all of the 1-bit and 2-bit options for the combinatorial portion of the ARC have been exhausted and the combinatorial algorithm is now iterating through 3-bit options, which will be used to determine the combinatorial portion of the ARC each time data is written to the external NVM 150. The 3-bit options will be explored until exhausted.

The processor then determines the power source has been depleted and/or determines that the physical intrusion sensor 312*d* has detected physical intrusion into the computing device 100. The processor then accesses the current fuse map in the volatile memory 120 and writes those values to the fuses of the one-time programmable memory 125 as the new static baseline value. In the example of FIG. 6, the fuse map in the volatile memory 120 was in the state illustrated by fuse map 625. The fuses set in this map will become the new static baseline value that is written to the one-time programmable memory 125 by the processor as represented by fuse map 630.

Figure 7:
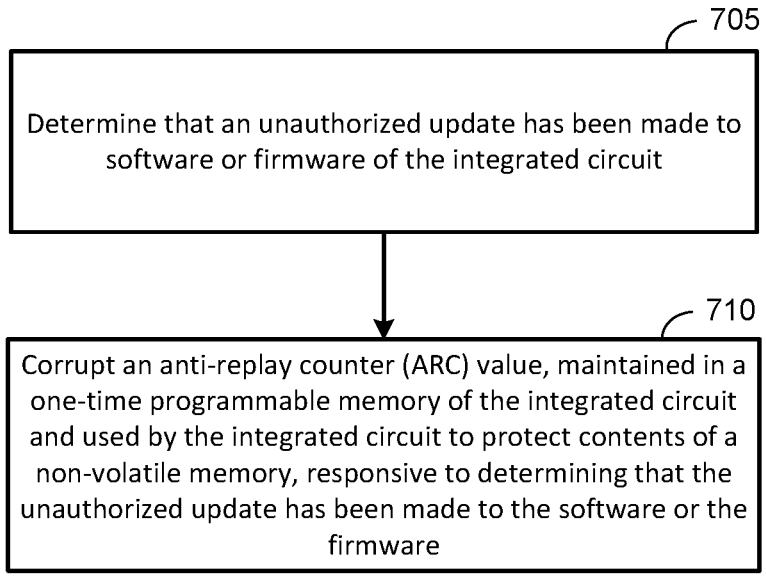
FIG. 7 is a flow diagram of an example process for securely erasing contents of secured non-volatile memory.

FIG. 7 is a flow diagram of an example process 700 for providing data protection in an integrated circuit. The process 700 can be used to effectively the erase contents of the NVM 150 by corrupting the ARC used to protect the contents of the NVM 150. The payload 155 may be obtained by unauthorized firmware or software installed on the computing device 100. But without the correct ARC value(s) associated with the payload(s) of data stored in the NVM 150, the contents of the payload(s) cannot be decrypted. The process illustrated in FIG. 7 can be used to prevent unauthorized updates to the firmware and/or software components of the computing device from accessing sensitive data stored in the NVM 150. The process illustrated in FIG. 7 can be implemented by the processor 190 of the secure processing subsystem 110 of the computing device 100 illustrated in FIGS. 1 and 2. The process 700 is executed by the computing device before any software or firmware can be executed that was included in an unauthorized update to the software or the firmware which may have at least read-access to the ARCs stored in the one-time programmable memory 125 and the volatile memory 120 of the computing device 100.

A determination can be made that an unauthorized update has been made to software or firmware associated with the integrated circuit (stage 705). The processor 190 determines whether an unauthorized update of the firmware and/or software of the computing device 100 has been made. The processor 190 monitors the firmware and/or software stored in the memory of the secure processing subsystem of the computing device and/or the external NVM.

One approach for determining whether an unauthorized update to software and/or firmware has occurred is to monitor for changes to the firmware and/or other critical software component(s) of the computing device 100 and to require the user of the computing device 100 to be authenticated either prior to the firmware and/or other critical software component being updated or in response to the firmware being updated on the computing device 100. An authorized user of the computing device can approve an update to the firmware and/or software components that may access user or enterprise owned data on the computing devices that may have access to sensitive user data or enterprise data stored therein. Where the computing device 100 is associated with an enterprise, a system administrator, network administrator, or other user authorized by the enterprise may need to be authenticated in order for the firmware and/or software components to be updated. A general enterprise user of the computing device 100 may not have full control over the installation and/or updates to firmware and/or software components on the computing device 100.

The processor 190 may perform an authentication procedure to determine whether the user of the computing device that has attempted to update the firmware and/or other critical software component(s) of the computing device 100. The processor may perform user authentication for firmware and/or other critical software component(s) of the computing device 100 that are trusted software components that could access the ARC 140, the transient components 270*a-n*, and/or the static baseline component 280 stored in the volatile memory 120 or the ARC 165 stored in the one-time programmable memory 125. If the user authentication fails, then the processor 190 can make a determination that the firmware and/or other critical software component(s) of the computing device 100 was unauthorized, and inhibit storage and/or use of the firmware and/or other critical software component(s).

The processor 190 can authenticate the user using various authentication techniques, and the techniques for securely erasing contents of secured non-volatile memory disclosed herein are not limited to a particular type of authentication technique. The user can be required to input a password, PIN, swipe pattern, or other such input that should only be known to an authorized user of the computing device. The computing device 300 can include a keypad, keyboard, and/or a touch screen user interface through which the user can provide the input. The processor 190 can compare the input to authorization information stored by the computing device 300 in a secure memory location of the computing device 300.

The user can also be authenticated by the processor 190 using biometric data. The sensors 312*a*-312*g* of the computing device 300 can include one or more sensors configured to collect biometric data from a user of the computing device 300. For example, the computing device 300 can include a fingerprint sensor for capturing one or more fingerprints of from a user of the computing device 300. The computing device 300 can include a sensor configured to scan one or more physical characteristics of the user of the computing device 300, such as a sensor configured to capture an image of the user's iris and/or retina, facial features, and/or other anatomical information that may be used to authenticate the user of the computing device 300. The sensors 312*a*-312*g* of the mobile device can also include a sensor configured to collect voice data for the user that can be analyzed by the processor 190 to determine whether characteristics of a voice of a current user of the computing device 300 matches the characteristics of the voice of an authorized user of the mobile device.

The authentication may be performed by a trusted execution environment, such as the TEE 380 illustrated in the example implementation of the computing device 300, to prevent an attacker from attempting to circumvent the authentication procedure. Authentication information for authorized users of the computing device 100 can be stored in a persistent memory of the computing device and may be encrypted or otherwise protected to prevent unauthorized access to and/or modification of the authentication information utilized by the trusted execution environment and/or other components of the computing device 100 to perform user authentication. The processor 190 of the computing device 100 may also maintain a list of firmware and/or critical software components that require user authentication in order to update these elements of the computing device 100.

Another approach that may be used in addition to or instead of requiring authentication of an authorized user prior to any software updates is to authenticate the program code of the updates to the firmware and/or critical software component(s) of the computing device 100. One way that the software update may be authenticated is by the processor 190 determining a message authentication code (MAC) for the update. The MAC can be computed by the processor 190 by applying a cipher-based message authentication code (CMAC) algorithm to the image file of the update and/or one or more components thereof. The CMAC algorithm can be provided a key derived from a Hardware Unique Key (HUK) 199 associated with the computing device. The HUK 199 can comprise a bit string that is stored in the one-time programmable memory 125 and/or in another secure memory location of the computing device 100. The HUK 199 is accessible by the processor 190 and may be accessible to certain trusted components of the computing device 100. The HUK 199 is inaccessible to untrusted program code, such as but not limited to program code operating outside of the TEE. The HUK 199 may be generated and programmed into the one-time programmable memory 125 by a manufacturer of the computing device 100.

The processor 190 of the computing device 100 uses the CMAC to determine whether one or more software image files associated with firmware and/or critical component(s) of software associated with the computing device 100 have been altered by an unauthorized user of the computing device 100. The processor 190 can be configured to require that a user of the computing device 100 be authenticated prior to generating the CMAC based on the HUK 199. The processor 190 can be configured to perform an authentication procedure, as discussed above, in order to authenticate the user of the computing device 100. If the authentication fails, the processor 190 can be configured to make a determination that the software update is unauthorized. Alternatively, if the authentication fails, the processor 190 can generate a false CMAC value that is not based on the HUK 199. The false CMAC value will not match an expected CMAC value previously generated and associated with the firmware and/or critical component(s) of the computing device 100, and the processor 190 can make a determination that the update was unauthorized. If, however, the user has correctly been authenticated, and the CMAC value generated by the processor 190 matches the expected CMAC value, then the software update can be determined to be authorized.

The secure processing subsystem 110 of the computing device 100 can include a secure bootloader 119 stored in a read-only memory (ROM) 105 that is configured to authenticate one or more firmware image files and/or image files for one or more critical software components of the computing device 100 using various secure boot mechanism techniques. The secure bootloader can also be configured to compute the CMAC image before allowing the device to be booted. If a CMAC value computed by the boot loader does not match the expected CMAC image value that was previously calculated and associated with a component to be authenticated by the secure boot loader, then the secure boot loader can determine that the software update was unauthorized.

The anti-replay counter (ARC) value 165, maintained in a one-time programmable memory 125 of the integrated circuit and used by the integrated circuit to protect contents of a non-volatile memory, can be corrupted responsive to determining that the unauthorized update has been made to the software or the firmware (stage 710). The non-volatile memory can be separate from the integrated circuit 110 (e.g., NVM 150) or can be a part of the integrated circuit (e.g., NVM 127 in some aspects). In response to the processor 190 detecting an unauthorized update to software and/or firmware, the processor 190 corrupts the ARC 165 stored in the one-time programmable memory 125 of the computing device 100. The processor 190 can clear the ARC 140, the transient components 270*a-n*, and/or the static baseline component 280 stored in the volatile memory 120. Corrupting the ARC 165 and clearing the ARC components from the volatile memory 120 prevents the software and/or firmware included in the unauthorized update from being able to recover the unencrypted payload contents stored in the NVM 150.

The detection of an unauthorized update to software and/or firmware can serve as a trigger event for the processor to update the ARC 165 stored in the one-time programmable memory 125 based on the ARC 140, the transient components 270*a-n*, and/or the static baseline component 280 stored in the volatile memory 120 maintained in the volatile memory 120. The processor writes the ARC 140 stored in the volatile memory 120 to the one-time programmable memory 125 as ARC 165. The processor 190 writes the static baseline component 280 to the one-time programmable memory 125 as the ARC 165. The processor 190 can combine a transient component 270 with the static baseline component 280 (e.g., as illustrated in FIGS. 4-6 and 9-11) to generate the ARC to be written to the ARC 165 stored in the one-time programmable memory 125. The secure processing subsystem 110 can also be configured to select a most recently determined value of the transient component 270 for generating the ARC to be written to the ARC 165 stored in the one-time programmable memory 125 or may select one of the transient component 270 values in the volatile memory 120. Once the ARC has been stored in the one-time programmable memory, the ARC 140, the transient components 270*a-n*, and/or the static baseline component 280 stored in the volatile memory 120 can be deleted, and the ARC 165 stored in the one-time programmable memory 125 can be corrupted by setting additional bits of the one-time programmable memory 125 storing the ARC 165.

Figure 8:
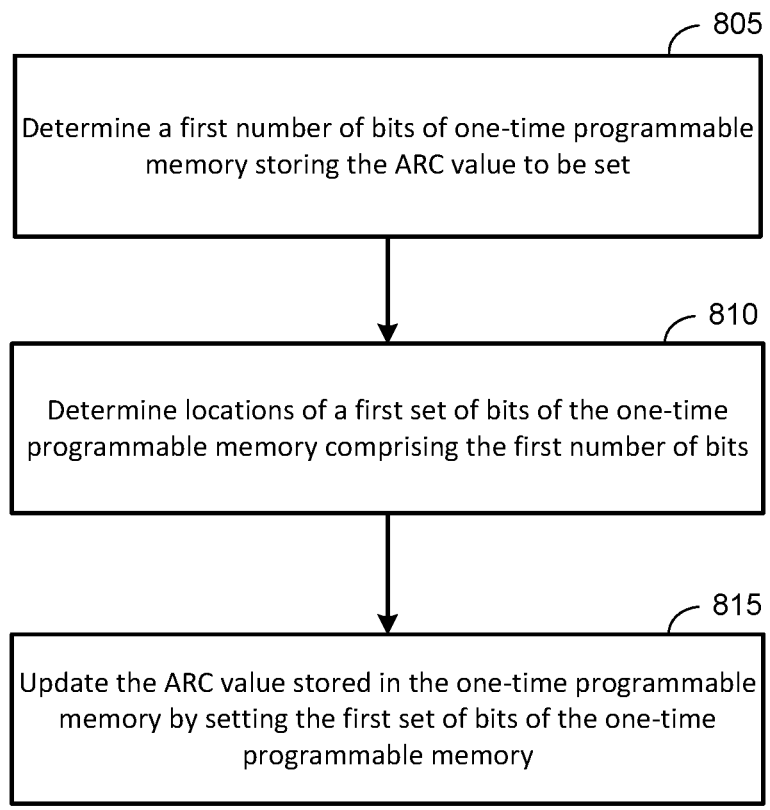
FIG. 8 is a flow diagram of an example process for corrupting the anti-replay counter.
Figure 9:
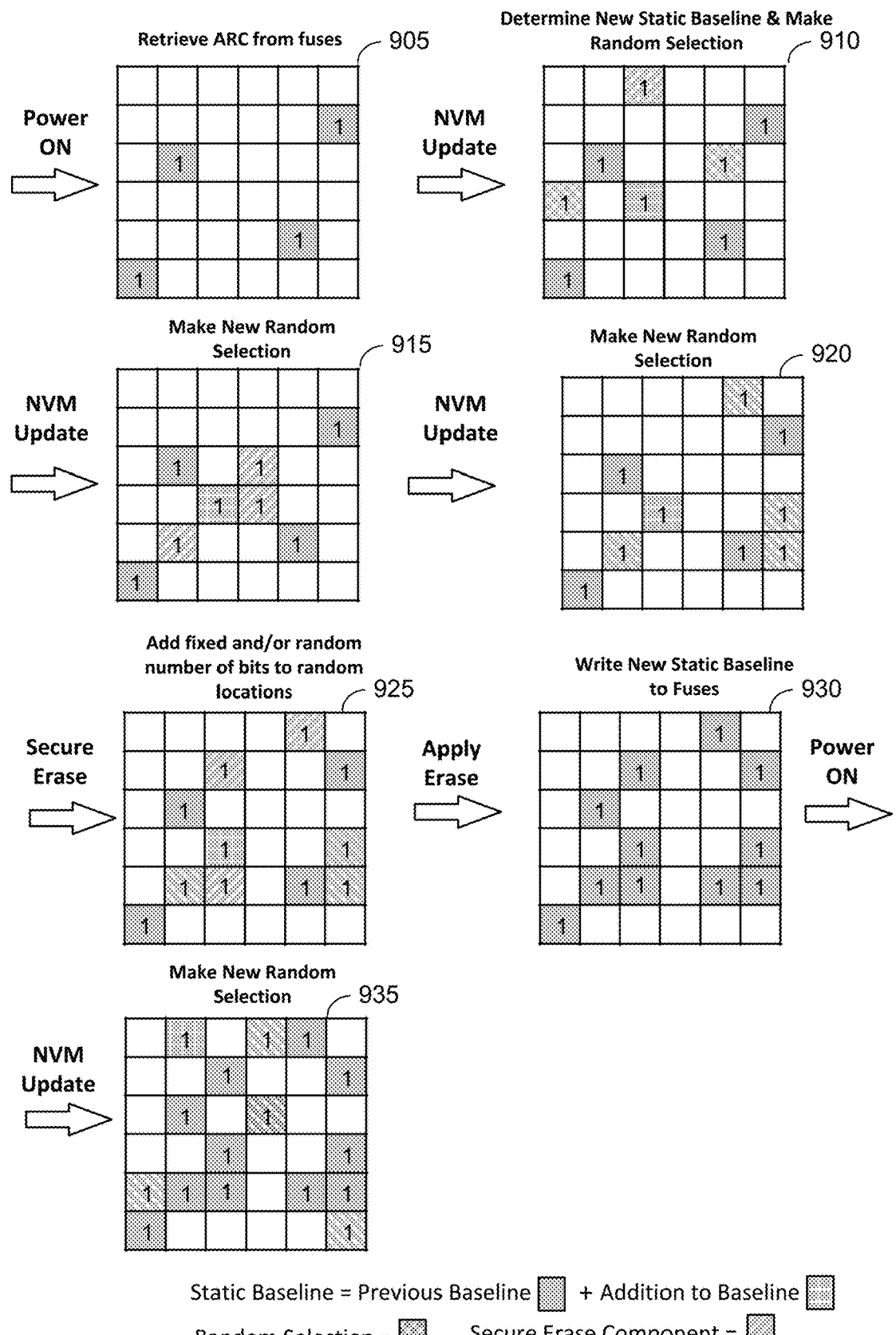
FIG. 9 is a diagram illustrating a technique for corrupting an anti-replay counter.
Figure 10:
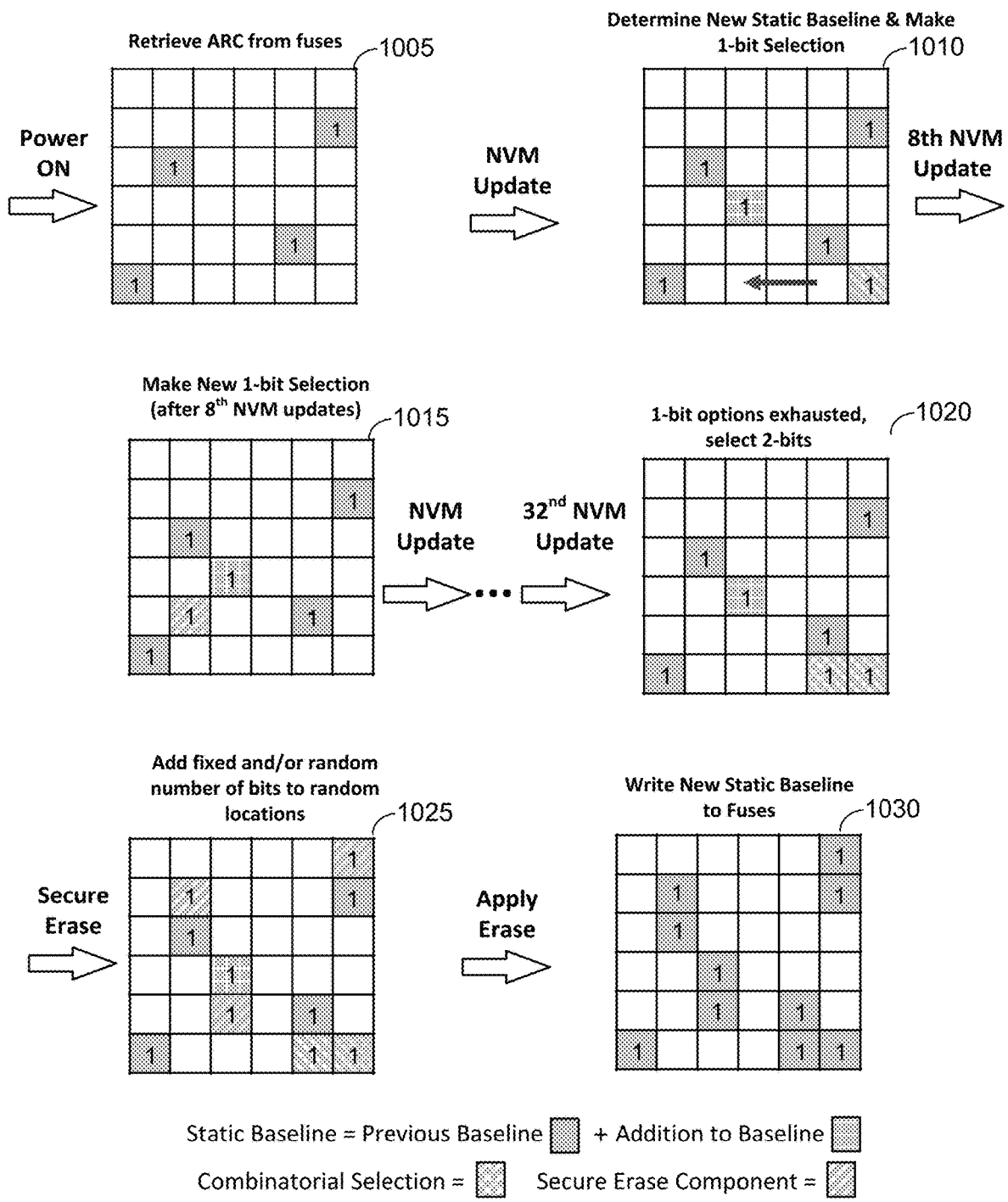
FIG. 10 is a diagram illustrating a technique for corrupting an anti-replay counter.
Figure 11:
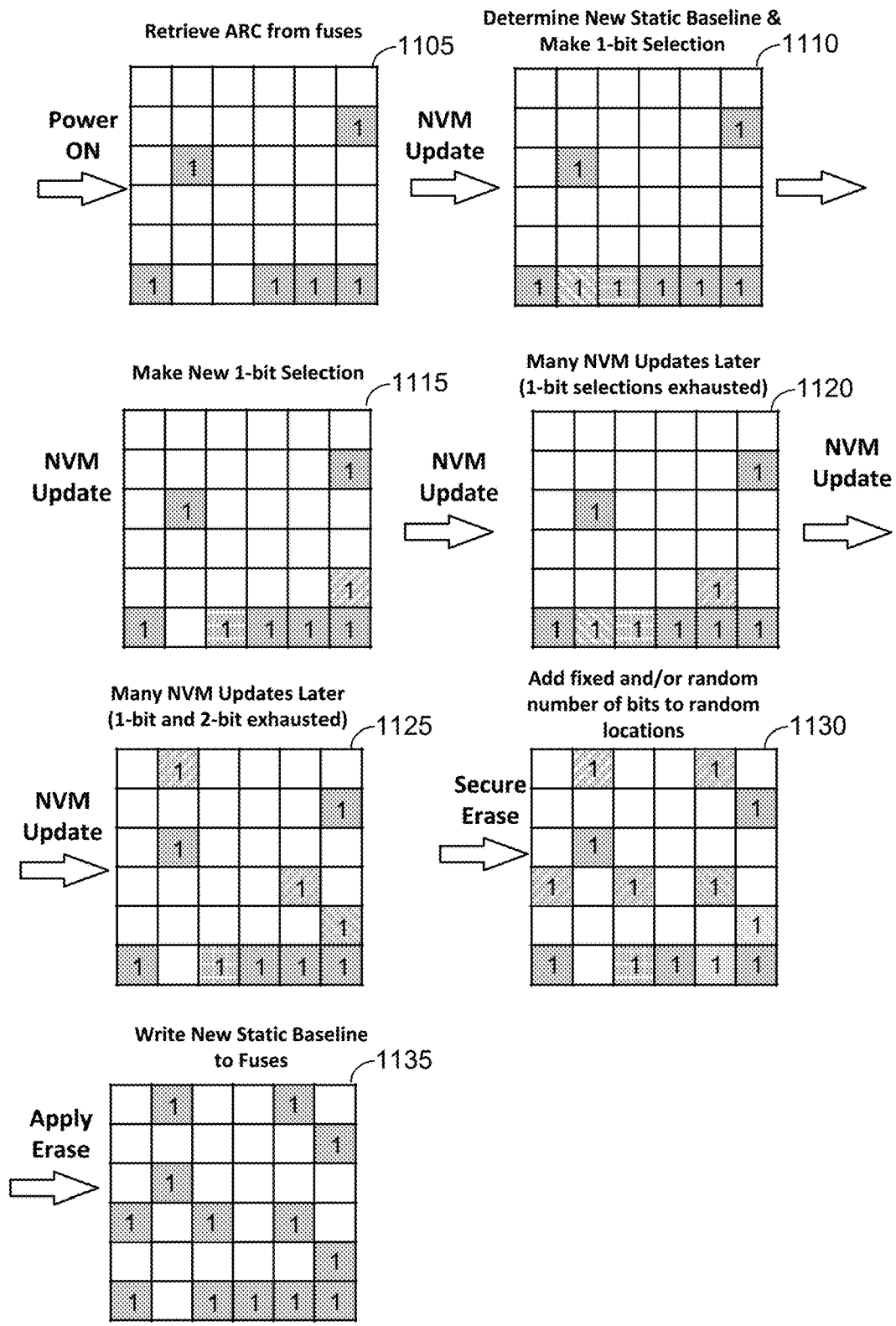
FIG. 11 is a diagram illustrating a technique for corrupting an anti-replay counter.

The process illustrated in FIG. 8 provides an example of one such method that can be used to corrupt the ARC 165, and FIGS. 9-11 illustrates example such a corruption technique being applied to the fuse maps from the preceding examples. The processor of the secure processing subsystem of the computing device can be configured to corrupt the ARC 165 responsive to an unauthorized update to software and/or firmware to prevent an attacker from being able to access the sensitive data stored in the NVM. The ARC 165 stored in the one-time programmable memory 125 of the computing device 100 can be corrupted, and the ARC 140, the transient components 270*a-n*, and/or the static baseline component 280 stored in the volatile memory 120 of the computing device 100 can be cleared prior to the execution of any of the software included in the unauthorized update to software and/or firmware.

FIG. 8 is a flow diagram of an example process 800 for corrupting the anti-replay counter according to the techniques disclosed herein. The process illustrated in FIG. 8 can be implemented by the processor of the secure processing subsystem 110 of the computing devices 100 and 200 illustrated in FIGS. 1 and 2, respectively. Furthermore, the process illustrated in FIG. 8 can be used to implement, at least in part, stage 710 of the process illustrated in FIG. 7. The process illustrated in FIG. 8 can be used to alter the ARC 165 prevent an attacker from gaining access to the sensitive data stored in the NVM 150. The ARC 165 stored in the one-time programmable memory 125 of the computing device 100 will no longer match the ARC used to when encrypting the payload(s) 155 stored in the NVM 150. Even if an attacker is able to install new firmware and/or software components on the computing device that are able to access the ARC 165 stored therein, the ARC will have already been corrupted. This approach effectively erases the protected contents of the NVM 150 of the computing device, because the ARC needed to decrypt and authenticate the contents of payload(s) stored in the NVM 150 will no longer be present in the memory of the computing device 100.

A first number of bits of the one-time programmable memory storing the ARC value to be set can be determined (stage 805). The processor 190 of the secure processing subsystem 110 of the computing device can be configured to determine a number of bits that are to be added to the ARC 165 to render the ARC 165 invalid. The secure processing subsystem 110 can be configured to determine whether the ARC 165 stored in the one-time programmable memory 125 includes a threshold number of bits that have been set.

The threshold number of bits can be selected based on a level of entropy desired with respect to the corruption of the ARC 165. A higher desired level of entropy is associated with a larger number of bits of the one-time programmable memory 125 be set, while a lower desired level of entropy is associated fewer bits of the one-time programmable memory 125 being set. The more bits of the one-time programmable memory 125 that are set makes it more difficult for an attacker to attempt to deduce what the ARC 165 should have been before being corrupted. The secure processing subsystem 110 can be configured to make such a determination to ensure that setting of the additional bits introduces a sufficient amount of entropy into to the ARC 165 such that guessing which bits were part of the ARC 165 and which bits have been added corrupt the ARC 165 would be prohibitively computationally intensive.

In an example implementation, the secure processing subsystem 110 is configured to determine that a first number of bits are to be set in the one-time programmable memory 125 in response to a current number of bits that have already been set in the one-time programmable memory 125 being less than or equal to a predetermined threshold. In this example implementation, the secure processing subsystem 110 is configured to determine that a second number of bits are to be set in the one-time programmable memory 125 in response to the current number of bits that have already been set in the one-time programmable memory 125 exceeding the predetermined threshold. The first number of bits is greater than the second number of bits. The first number of bits is selected for situations where the one-time programmable memory has a smaller number of bits currently set to make determining the ARC more computationally intensive before the ARC was intentionally corrupted. Furthermore, the first and second number of bits may be defined as a range of bits, and the secure processing subsystem 110 can be configured to select a number of bits to be set that falls within the appropriate range of bits.

To illustrate this concept with a first example, assume that the threshold number of bits is 64 bits, the first number of bits comprises 128 bits, the second number of bits comprises 64 bits, and the ARC 165 stored in the one-time programmable memory 125 currently comprises 40 bits. In this example, the current number of bits that are set in the ARC 165 of the one-time programmable memory 125 is 40 bits, which is less than the threshold of 64 bits. Therefore, the secure processing subsystem 110 would add the first number of bits, 128 bits in this example, to the current value of the ARC 165.

To illustrate this concept with a second example, assume that the threshold number of bits is 64 bits, the first number of bits comprises 128 bits, and the second number of bits comprises 64 bits, and the ARC 165 stored in the one-time programmable memory 125 currently comprises 100 bits. In this example, the current number of bits that are set in the ARC 165 of the one-time programmable memory is 100 bits, which exceeds the threshold of 64 bits. Therefore, the secure processing subsystem would add the second number of bits, which is 64 bits in this example, to the current value of the ARC 165.

The bits to be added to the ARC 165 in the one-time programmable memory 125 and the threshold values utilized in these examples are intended to illustrate the concepts disclosed herein and are not intended to limit these techniques to these specific values. The techniques disclosed can be configured to add a different number of bits to the ARC 165 in the one-time programmable memory 125. Furthermore, these techniques can be implemented using different thresholds and/or multiple thresholds to determine how many bits are to be added to the ARC in the one-time programmable memory. These techniques can also be implemented to utilize a range or ranges of bit values, and the secure processing subsystem 110 can be configured to randomly select a number of bits that falls within a particular range associated with the number of bits that are currently set in the ARC 165 of the one-time programmable memory 125.

The locations of a first set of bits of the one-time programmable memory comprising a first number of bits can be determined (stage 810). Stage 805 comprises determining how many bits of the one-time programmable memory comprising the ARC is to be set. Stage 810 comprises determining which bits of the one-time programmable memory 125 are to be selected to be set in order to corrupt the ARC 165 stored in the one-time programmable memory 125. The processor 190 determines the locations of the bits to be set. The processor 190 can use a random or pseudo-random algorithm to select bits of the one-time programmable memory 125 comprising the ARC 165 that have not yet been set. An attacker would then need to not only determine how many bits were set in the one-time programmable memory, but also which bits were set in order to determine what the ARC 165 was before the value was intentionally corrupted.

The ARC stored in the one-time programmable memory 125 can be updated by setting the first set of bits of the one-time programmable memory (stage 815). The processor 190 can set the values of the first set of bits of the one-time programmable memory 125. The ARC 165 stored in the one-time programmable memory 125 can be corrupted by writing a value to the bits selected in stage 810. The bits that were selected in stage 810 can be set by processor 190 by blowing the fuses, antifuses, or other components of the one-time programmable memory 125 that are used to represent individual bits of data. The process illustrated in FIG. 8 can be performed in response to an unauthorized update to software and/or firmware being detected and prior to the software being executed. As a result, the attacker would not have access to a valid ARC 165 and would not be able to decrypt the data stored in the NVM 150. This approach effectively erases the contents of the NVM 150 by rendering the contents unrecoverable due to the corruption of the ARC.

FIGS. 9-11 provide examples of the techniques for corrupting the anti-replay counter that are based on the examples illustrated in FIGS. 4-6 discussed above. FIG. 9 adapts the example illustrated in FIG. 4 to include detecting an unauthorized update to software and/or firmware, and corrupting the ARC stored in the one-time programmable memory. Fuse maps 905, 910, 915, and 920 mirror those of the fuse maps 405, 410, 415, and 420 illustrated in FIG. 4. However, after the NVM update which prompted the determination of the ARC illustrated in fuse map 920, an unauthorized update to software and/or firmware is detected, and a secure erase is triggered. The fuse map 925 illustrate that two new bits have been selected in addition to the bit values that were represented in the fuse map 920. At this stage, a fixed or random number of bits can be selected by the processor 190 at random locations from the bitmap representing the fuses of the one-time programmable memory in which the ARC is stored. In this example, only two bits were selected as a matter of clarity, but the techniques disclosed herein are not limited to adding three new bits. The greater number of bits selected make determining how many bits and which bits were added to former ARC more difficult. A new static baseline value (fuse map 930) based on the most recent ARC and the additional bits to obfuscate the ARC is then written to the one-time programmable memory by the processor 190. Any data stored in the NVM that relied on the old ARC will be rendered unrecoverable as a result of the ARC being incremented and the ARCs stored in the volatile memory 120 being removed. Any transient components 275a-275n stored in the NVM 150 can also be deleted from the NVM 150 and/or corrupted by the processor 190. The next time that the device powers up, the new static baseline value represented in fuse map 930 will serve as the basis for a subsequent update to the NVM content (see fuse map 935). No sensitive data stored in the NVM would have been recoverable by the attacker. Furthermore, any ARC data stored in a volatile memory of the computing device can also be deleted to make it more difficult for the attacker to determine the previous state of the ARC.

FIG. 10 further illustrates these concepts by adapting the example illustrated in FIG. 5 to include detecting an unauthorized update to software and/or firmware, and corrupting the ARC stored in the one-time programmable memory 125. Fuse maps 1005, 1010, 1015, and 1020 mirror those of the fuse maps 505, 510, 515, and 520 illustrated in FIG. 5. However, after the NVM update which prompted the determination of the ARC illustrated in fuse map 1020, an unauthorized update to software and/or firmware is detected by the processor 190, and a secure erase is triggered by the processor 190. The fuse map 1025 illustrates that three new bits have been selected in addition to the bit values that were represented in the fuse map 1020. In this example, only three bits were selected as a matter of clarity, but the techniques disclosed herein are not limited to adding three new bits. A new static baseline value (fuse map 1030) based on the most recent ARC and the additional bits to obfuscate the ARC is then written to the one-time programmable memory 125 by the processor 190. Any data stored in the NVM that relied on the old ARC will be rendered unrecoverable by the attacker. Furthermore, any ARC data stored in a volatile memory 120 and/or the NVM 150 of the computing device can also be deleted and/or corrupted to make it more difficult for an attacker to determine the previous state of the ARC.

FIG. 11 further illustrates these concepts by adapting the example illustrated in FIG. 6 to include detecting an unauthorized update to software and/or firmware, and corrupting the ARC stored in the one-time programmable memory 125. Fuse maps 1105, 1110, 1115, 1120, and 1125 mirror those of the fuse maps 605, 610, 615, 620, and 625 illustrated in FIG. 6. However, after the NVM update which prompted the determination of the ARC illustrated in fuse map 1125, an unauthorized update is detected, and a secure erase is triggered. The fuse map 1130 illustrates that three new bits have been selected by the processor 190 in addition to the bit values that were represented in the fuse map 1125. In this example, only three bits were selected as a matter of clarity, but the techniques disclosed herein are not limited to adding three new bits. A new static baseline value (fuse map 1135) based on the most recent ARC and the additional bits to obfuscate the ARC is then written to the one-time programmable memory 125 by the processor 190. Any data stored in the NVM that relied on the old ARC will be rendered unrecoverable by the attacker. Furthermore, any ARC data stored in a volatile memory 120 and/or the NVM 150 of the computing device can also be deleted and/or corrupted to make it more difficult for an attacker to determine the previous state of the ARC.

The preceding examples of FIGS. 9-11 are intended to illustrate the concepts for preventing an attacker from installing unauthorized software on the computing device in order to gain access to sensitive data stored in the NVM 150. The specific number of bits added to the ARC and the specific bits that are selected are intended to illustrate these concepts and not to limit the techniques disclosed herein to these specific example implementations.

Figure 12:
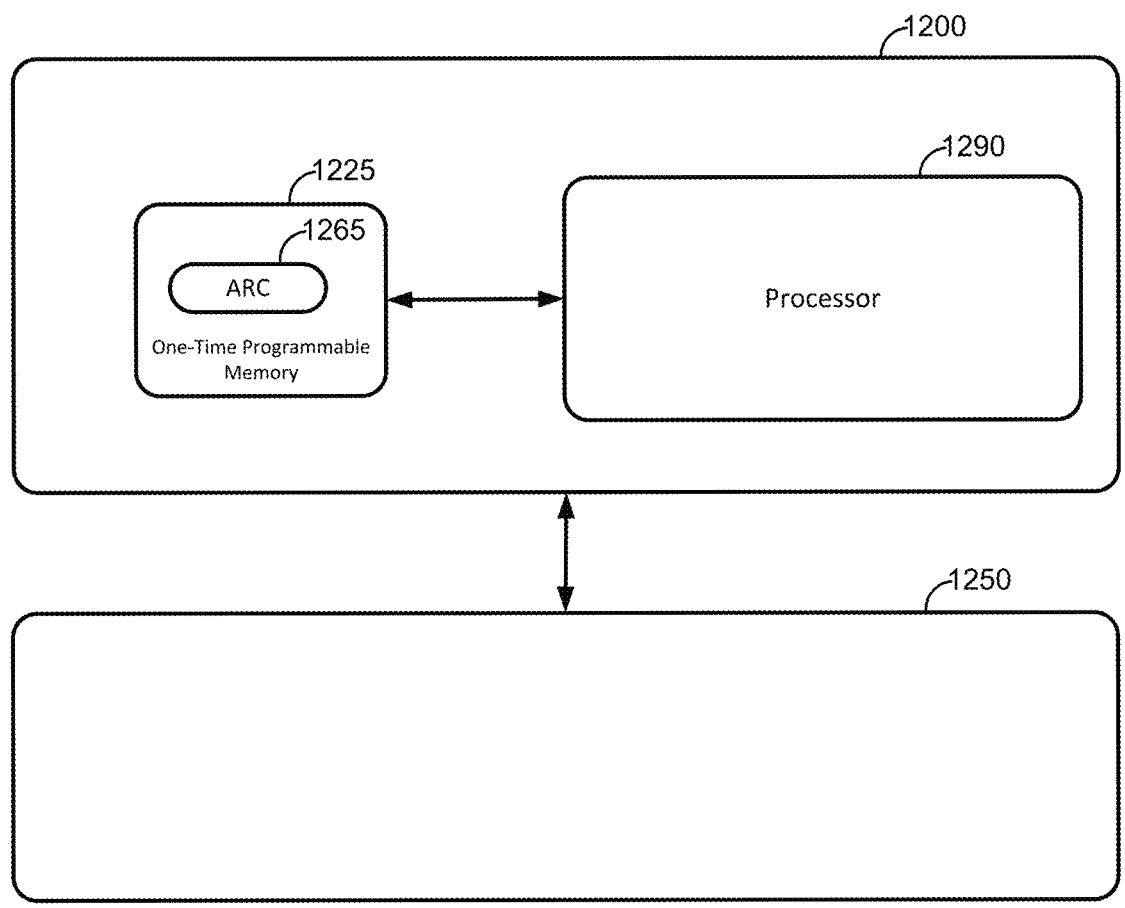
FIG. 12 is a diagram illustrating an example integrated circuit.

FIG. 12 is a block diagram of an example integrated circuit 1200. The integrated circuit comprises a processor 1290 and a one-time programmable memory 1225. The one-time programmable memory 1225 can be communicably coupled with the processor 1290. In some implementations, the one-time programmable memory 1225 may be implemented as part of the processor 1290, and may be treated as internal memory to the processor 1290. The processor 1290 can be configured to determine that an unauthorized update has been made to software or firmware associated with the integrated circuit. The software may be stored in a computer-readable memory internal to the integrated circuit 1200 or external to the integrated circuit, such as the non-volatile memory 1250. The processor 1290 can be configured to corrupt an anti-replay counter (ARC) value, such as the ARC 1265, maintained in the one-time programmable memory 1225 of the integrated circuit 1200 and used by the integrated circuit 1200 to protect contents of a non-volatile memory 1250. The processor 1290 can be configured to corrupt the ARC 1265 responsive to determining that the unauthorized update has been made to the software or the firmware.

The integrated circuit 1200 may be similar to the secure processing subsystem 110 illustrated in FIGS. 1 and 2 discussed above, which may be implemented on an integrated circuit including but not limited to an SoC. The integrated circuit 1200 may be implemented by the computing device 300 illustrated in FIG. 3. The processor 1290 may be similar to the processor 190 illustrated in FIGS. 1 and 2 or may be similar to the processor 310 illustrated in FIG. 3. The one-time programmable memory 1225 may be similar to the one-time programmable memory 125 or the one-time programmable memory 325 illustrated in FIG. 3. The ARC 1265 can be represented as a one- or two-dimensional array of bits of the one-time programmable memory 125, similar to those ARC 165 discussed above.

The methodologies described herein may be implemented by various means depending upon the application. For example, these methodologies may be implemented in hardware, firmware, software, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory and executed by a processor unit. Memory may be implemented within the processor unit or external to the processor unit. As used herein the term "memory" refers to any type of long term, short term, volatile, nonvolatile, or other memory and is not to be limited to any particular type of memory or number of memories, or type of media. Tangible media include one or more physical articles of machine-readable media, such as random-access memory, magnetic storage, optical storage media, and so on.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. Such media also provide examples of non-transitory media, which can be machine readable, and wherein computers are an example of a machine that can read from such non-transitory media.

Furthermore, the methods, systems, and devices discussed above are examples. Various configurations may omit, substitute, or add various procedures or components as appropriate. For instance, in alternative configurations, the methods may be performed in an order different from that described, and various steps may be added, omitted, or combined. Also, features described with respect to certain configurations may be combined in various other configurations. Different aspects and elements of the configurations may be combined in a similar manner. Also, technology evolves, and thus many of the elements are examples and other elements, including elements developed in the future, may be used.

The generic principles discussed herein may be applied to other implementations.

What is claimed is:

1. A method for providing data protection in an integrated circuit, the method comprising:
   detecting a change to software or firmware;
   determining whether a user is authentic in response to detecting the change to the software or the firmware;
   generating a false cipher-based message authentication code (CMAC) value that is not based on a Hardware Unique Key (HUK) associated with the integrated circuit in response to the user not being authentic;
   determining that the change to the software or the firmware was unauthorized based at least in part on the false CMAC value not matching an expected CMAC value; and
   corrupting an anti-replay counter (ARC) value, maintained in a one-time programmable memory of the integrated circuit and used by the integrated circuit to protect contents of a non-volatile memory, responsive to determining that the change to the software or the firmware was unauthorized.

2. The method of claim 1, wherein corrupting the ARC value comprises:
   updating an ARC value stored in the one-time programmable memory with a current ARC value maintained in volatile memory.

3. The method of claim 2, further comprising:
   determining a first number of bits of the one-time programmable memory storing the ARC value to be set;
   determining locations of a first set of bits of the one-time programmable memory comprising the first number of bits; and
   updating the ARC value stored in the one-time programmable memory by setting the first set of bits of the one-time programmable memory.

4. The method of claim 3, wherein determining the first number of bits of the one-time programmable memory to set comprises:
   determining the first number of bits of the one-time programmable memory to set based on a second number of bits already set in the one-time programmable memory.

5. The method of claim 3, wherein determining the first set of bits of the one-time programmable memory to be set comprises:
   randomly selecting the first set of bits of the one-time programmable memory from a second set of bits that have not been set in the one-time programmable memory.

6. The method of claim 1 wherein the Hardware Unique Key (HUK) comprises a bit string stored in a secure memory location of a computing device.

7. The method of claim 1 wherein the Hardware Unique Key (HUK) comprises a bit string stored in a one-time programmable memory of a computing device.

8. An integrated circuit providing data protection, the integrated circuit comprising:
a one-time programmable memory;
a processor communicably coupled to the one-time programmable memory, the processor configured to:
detect a change to software or firmware;
determine whether a user is authentic in response to detecting the change to the software or the firmware;
generate a false cipher-based message authentication code (CMAC) value that is not based on a Hardware Unique Key (HUK) associated with the integrated circuit in response to the user not being authentic;
determine that the change to the software or the firmware was unauthorized based at least in part on the false CMAC value not matching an expected CMAC value; and
corrupt an anti-replay counter (ARC) value, maintained in the one-time programmable memory of the integrated circuit and used by the integrated circuit to protect contents of a non-volatile memory, responsive to determining that the change to the software or the firmware was unauthorized.

9. The integrated circuit of claim 8, wherein the processor being configured to corrupt the ARC value is further configured to:
update a first ARC value stored in the one-time programmable memory with a second ARC value maintained in volatile memory of the integrated circuit.

10. The integrated circuit of claim 9, wherein the processor is further configured to:
determine a first number of bits of the one-time programmable memory storing the ARC value to be set;
determine locations of a first set of bits of the one-time programmable memory comprising the first number of bits; and
update the ARC value stored in the one-time programmable memory by setting the first set of bits of the one-time programmable memory.

11. The integrated circuit of claim 10, wherein the processor being configured to determine the first number of bits of the one-time programmable memory to set is further configured to:
determine the first number of bits of the one-time programmable memory to set based on a second number of bits already set in the one-time programmable memory.

12. The integrated circuit of claim 10, wherein the processor being configured to determine which bits of the one-time programmable memory to set is further configured to:
randomly select the first set of bits of the one-time programmable memory from a second set of bits that have not been set in the one-time programmable memory.

13. A non-transitory, computer-readable medium, having stored thereon computer-readable instructions for providing data protection in an integrated circuit, comprising instructions configured to cause a computer to:
detect a change to software or firmware;
determine whether a user is authentic in response to detecting the change to the software or the firmware;
generate a false cipher-based message authentication code (CMAC) value that is not based on a Hardware Unique Key (HUK) associated with the integrated circuit in response to the user not being authentic;
determine that the change to the software or the firmware was unauthorized based at least in art on the false CMAC value not matching an expected CMAC value; and
corrupt an anti-replay counter (ARC) value, maintained in a one-time programmable memory of the integrated circuit and used by the integrated circuit to protect contents of a non-volatile memory, responsive to determining that the change to the software or the firmware was unauthorized.

14. The non-transitory, computer-readable medium of claim 13, wherein the instructions configured to cause the computer to corrupt the ARC value further comprise instructions configured to cause the computer to:
update a first ARC value stored in the one-time programmable memory with a second ARC value maintained in volatile memory of the integrated circuit.

15. The non-transitory, computer-readable medium of claim 14, further comprising instructions configured to cause the computer to:
determine a first number of bits of the one-time programmable memory storing the ARC value to be set;
determine locations of a first set of bits of the one-time programmable memory comprising the first number of bits; and
update the ARC value stored in the one-time programmable memory by setting the first set of bits of the one-time programmable memory.

16. The non-transitory, computer-readable medium of claim 15, wherein the instructions configured to cause the computer to determine the first number of bits of the one-time programmable memory to set further comprise instructions configured to cause the computer to:
determine the first number of bits of the one-time programmable memory to set based on a second number of bits already set in the one-time programmable memory.

17. The non-transitory, computer-readable medium of claim 16, wherein the instructions configured to cause the computer to determine which bits of the one-time programmable memory to set further comprise instructions configured to cause the computer to:
randomly select the first set of bits of the one-time programmable memory from a second set of bits that have not been set in the one-time programmable memory.

* * * * *